US011336731B1

(12) United States Patent
Kumar et al.

(10) Patent No.: US 11,336,731 B1
(45) Date of Patent: May 17, 2022

(54) METHODS AND SYSTEMS FOR IDENTIFYING DEVICES AND POSITIONS OF DEVICES IN AN IOT ENVIRONMENT

(71) Applicant: SAMSUNG ELECTRONICS CO., LTD., Suwon-si (KR)

(72) Inventors: Prateek Kumar, Bangalore (IN); Mugula Satya Shankar Kameshwar Sharma, Bangalore (IN); Pavithra Vancheeswaran, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/323,630

(22) Filed: May 18, 2021

(30) Foreign Application Priority Data

Nov. 11, 2020 (IN) .............................. 202041049315

(51) Int. Cl.
*G06F 15/173* (2006.01)
*H04L 67/12* (2022.01)
*G16Y 40/60* (2020.01)
*G16Y 40/35* (2020.01)
*G16Y 40/10* (2020.01)

(52) U.S. Cl.
CPC .............. *H04L 67/12* (2013.01); *G16Y 40/10* (2020.01); *G16Y 40/35* (2020.01); *G16Y 40/60* (2020.01)

(58) Field of Classification Search
CPC ... H04L 51/28; H04L 51/046; H04L 63/0807; H04L 63/108
See application file for complete search history.

(56) References Cited

U.S. PATENT DOCUMENTS

| 10,002,526 | B1* | 6/2018 | Dyer ...................... G08C 17/02 |
| 2015/0029880 | A1* | 1/2015 | Burns ................... H04W 84/18 370/252 |
| 2016/0149767 | A1 | 5/2016 | Britt et al. |
| 2018/0122226 | A1 | 5/2018 | Ahn et al. |
| 2018/0211665 | A1 | 7/2018 | Park et al. |
| 2019/0035398 | A1 | 1/2019 | Choi et al. |
| 2020/0244297 | A1* | 7/2020 | Zalewski ............. H02N 11/002 |
| 2020/0334125 | A1* | 10/2020 | Degaonkar ......... G06F 11/0793 |

OTHER PUBLICATIONS

Communication dated Aug. 24, 2021, issued by the International Searching Authority in counterpart International Application No. PCT/KR2021/005863 (PCT/ISA/210 and PCT/ISA/210/237).

* cited by examiner

*Primary Examiner* — Normin Abedin
(74) *Attorney, Agent, or Firm* — Sughrue Mion, PLLC

(57) ABSTRACT

Methods and systems for identifying devices in an Internet of Things (IoT) environment are provided. A method includes detecting at least one action initiated by a user using a user device; generating at least one device type watermark for each of one or more second devices capable of performing the at least one action; transmitting, to an IoT cloud server, a request including at least one time slot for each of the one or more second devices, the request requesting each of the one or more second devices to indicate the at least one device type watermark in the at least one time slot; and identifying at least one second device to perform the at least one action, among the one or more second devices, based on detecting the at least one device type watermark indicated by the at least one second device.

20 Claims, 28 Drawing Sheets

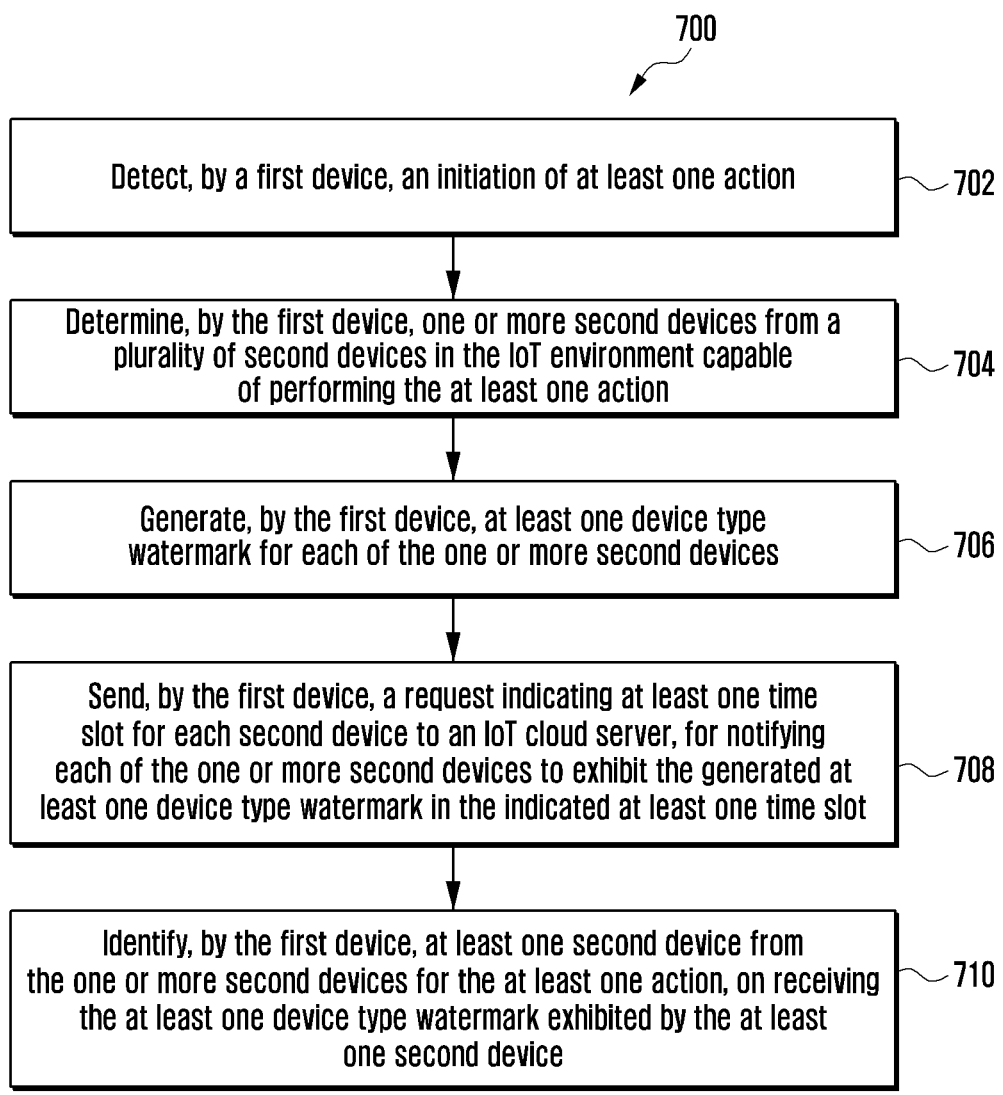

FIG. 10A
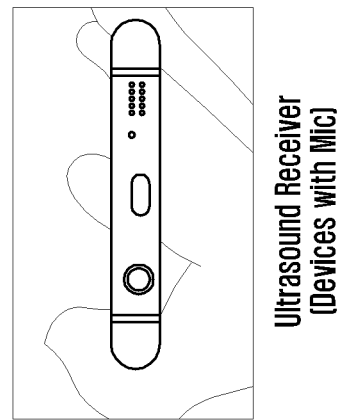
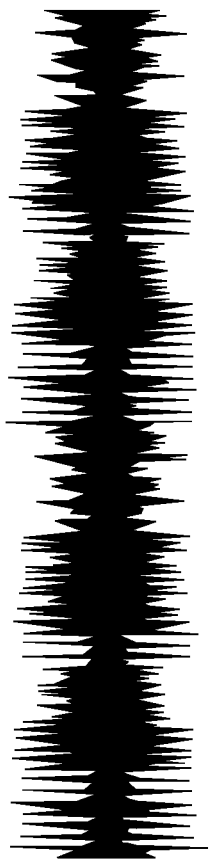
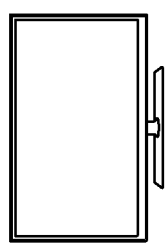

FIG. 11A
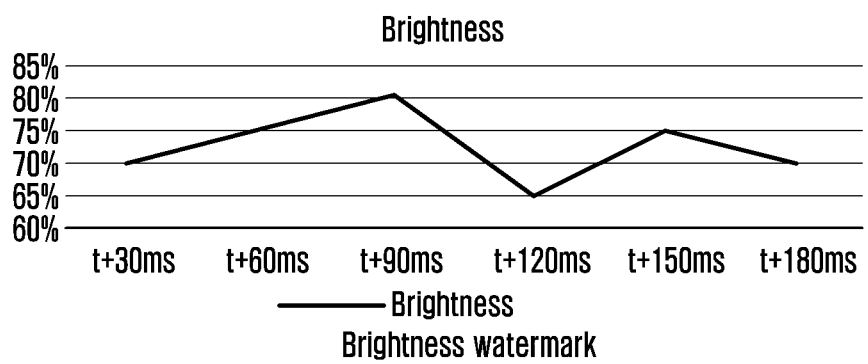
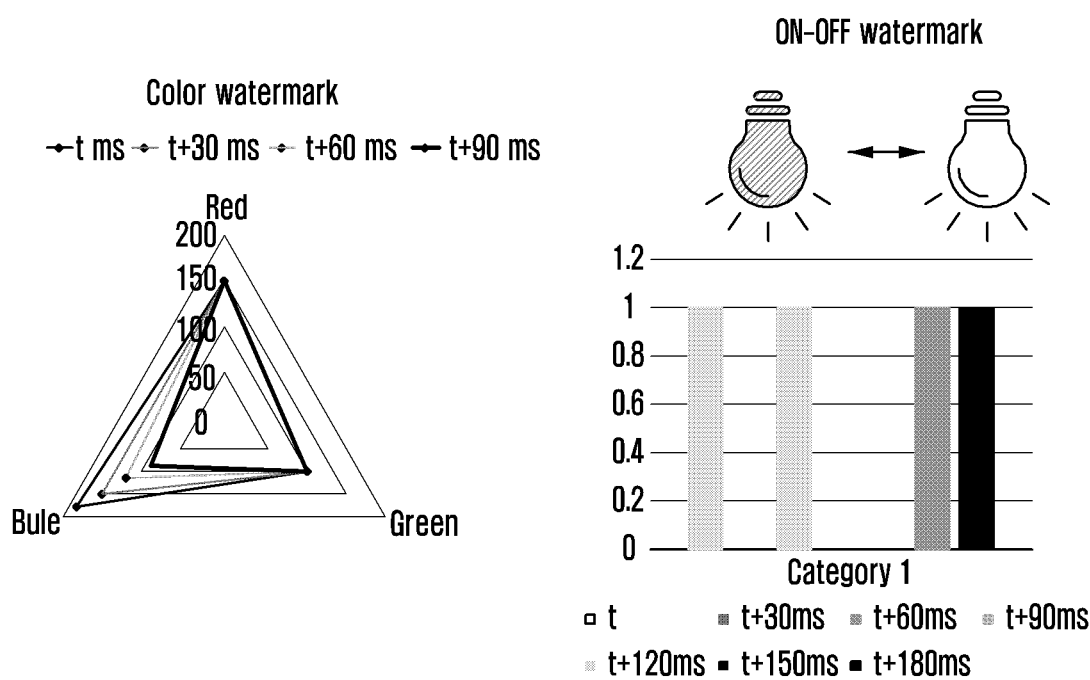

FIG. 11B
Cannot be seen by mobile inside living room
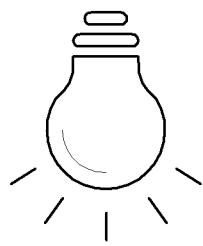
Seen by mobile inside living room
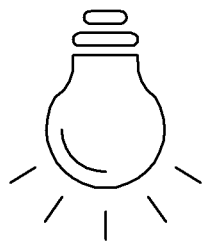 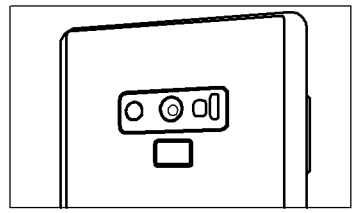
Cannot be seen by mobile inside living room
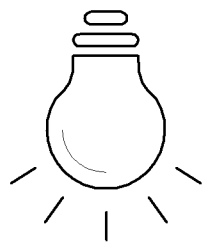
Kitchen

METHODS AND SYSTEMS FOR IDENTIFYING DEVICES AND POSITIONS OF DEVICES IN AN IOT ENVIRONMENT

CROSS-REFERENCE TO RELATED APPLICATION(S)

This application is based on and claims priority under 35 U.S.C. 119 to Indian Patent Application No. 202041049315 filed on Nov. 11, 2020 in the Indian Patent Office, the disclosures of which are herein incorporated by reference in their entireties.

FIELD

Example embodiments of the disclosure relate to the field of an Internet of Things (IoT) environment and more particularly to identifying devices and positions of the devices in an IoT environment using device type watermarks.

BACKGROUND

In general, an Internet of Things (IoT) environment includes a plurality of devices with which users may interact and perform actions. Examples of the actions may be, but not limited to, capturing media, casting, playing audio, and the like. When a user wants to perform any actions, the user may first identify devices of interest with which to perform the actions, among devices that are present in a specific environment and/or area. In the related art, additional devices such as, but not limited to, cameras, sensors, and the like, may be provided in each area to identify a presence of the user in the area and the devices that are of interest to the user. However, the additional devices to identify the devices that are of interest to the user cause increased cost.

In addition, the user may not want to use the additional devices, due to cost and privacy constraints. In such a scenario, for performing a specific action, the user may be presented with multiple devices of the same type that are included in the IoT environment. In this case, the user may not be provided with particular devices of interest to perform the specific action.

SUMMARY

One or more example embodiments provide methods and systems for identifying devices and positions of the devices in an Internet of Things (IoT) environment based on device type watermarks.

One or more example embodiments provide methods and systems for detecting at least one action initiated by a user using a user device and generating a device type watermark for each of devices present in the IoT environment that include at least one functional capability to perform the initiated at least one action.

One or more example embodiments provide methods and systems for indicating a time slot for each of the devices to indicate the generated device type watermark.

One or more example embodiments provide methods and systems for identifying at least one of the devices for performing the initiated action and/or position of the at least one device, when the device type watermark indicated by the at least one device is received by the user device.

According to an aspect of an example embodiment, provided is a method for identifying at least one device in an Internet of Things (IoT) environment. The method includes: receiving, by a first device included in the IoT environment, an input to initiate at least one action; determining, by the first device, one or more second devices from a plurality of second devices in the IoT environment, the one or more second devices being capable of performing the at least one action; generating, by the first device, at least one device type watermark for each of the one or more second devices; transmitting, to an IoT cloud server by the first device, a request including at least one time slot for each of the one or more second devices, the request requesting each of the one or more second devices to indicate the at least one device type watermark in the at least one time slot; and identifying, by the first device, at least one second device to perform the at least one action, among the one or more second devices, based on detecting the at least one device type watermark indicated by the at least one second device.

According to an aspect of an example embodiment, provided is a first device in an Internet of Things (IoT) environment, the IoT environment including a plurality of second devices and an IoT cloud server. The first device includes: a memory configured to store program code; and a processor configured to read the program code and operate as instructed by the program code to: receive an input to initiate at least one action; determine one or more second devices from the plurality of second devices in the IoT environment, the one or more second devices being capable of performing the at least one action; generate at least one device type watermark for each of the one or more second devices; transmit, to the IoT cloud server, a request including at least one time slot for each of the one or more second devices, the request requesting each of the one or more second devices to indicate the at least one device type watermark in the at least one time slot; and identify at least one second device to perform the at least one action, among the one or more second devices, based on detecting the at least one device type watermark indicated by the at least one second device.

BRIEF DESCRIPTION OF FIGURES

The above and other aspects, features, and advantages of certain example embodiments of the disclosure will be more apparent from the following description taken in conjunction with the accompanying drawings, in which:

FIG. 7 is a flow diagram depicting a method for identifying devices in an IoT environment based on device type watermarks, according to example embodiments;

FIGS. 10A and 10B are example diagrams depicting an audio watermark, according to example embodiments;

FIGS. 11A and 11B are example diagrams depicting a light watermark, according to example embodiments;

DETAILED DESCRIPTION

Figure 1A:
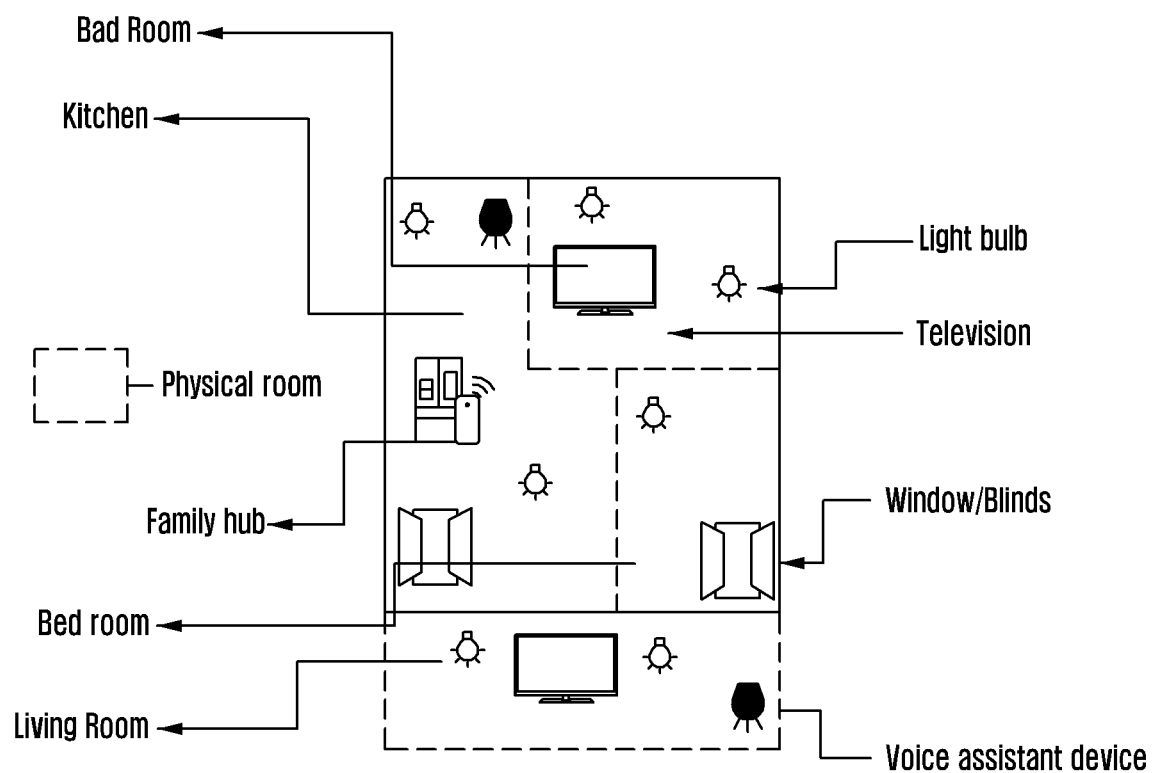
FIGS. 1A, 1B and 1C depict examples of identifying devices in an Internet of Things (IoT) environment.

The example embodiments herein and the various features and advantageous details thereof are explained more fully with reference to the non-limiting embodiments that are illustrated in the accompanying drawings and detailed in the following description. Descriptions of known components and processing techniques may be omitted so as to not unnecessarily obscure the embodiments herein. The description herein is intended merely to facilitate an understanding of ways in which the example embodiments herein may be practiced and to further enable those of skill in the art to practice the example embodiments herein. Accordingly, the example embodiments should not be construed as limiting the scope of the disclosure.

In addition, the term "and/or" in this specification describes only an association relationship for describing associated objects and represents that three relationships may exist. For example, A and/or B may represent the following three cases: Only A exists, both A and B exist, and only B exists. In addition, if there is no special description, the character "/" in this specification generally indicates an "and/or" relationship between the associated objects.

Expressions such as "at least one of," when preceding a list of elements, modify the entire list of elements and do not modify the individual elements of the list. Also, terms such as "include" or "comprise" may be construed to denote a certain constituent element, but may not be construed to exclude the existence of or a possibility of addition of one or more other constituent elements.

Furthermore, terms such as "-portion," "-unit," "-module," and "-block" stated in the specification may signify a unit to process at least one function or operation and the unit may be embodied by hardware, software, or a combination of hardware and software.

The connections, connecting lines, or connectors shown in the various figures presented are intended to represent functional relationships and/or physical or logical couplings between the various elements. It should be noted that many alternative or additional functional relationships, physical connections or logical connections may be present in a practical device.

The use of any and all examples, or language (e.g., "such as") provided herein, is intended merely to better illuminate the disclosure and does not pose a limitation on the scope of the disclosure unless otherwise claimed.

Example embodiments herein provide methods and systems for identifying devices of interest in an Internet of Things (IoT) environment, using device type watermarks. Example embodiments are described referring to the drawings, in which similar reference characters denote corresponding features consistently throughout the figures.

FIG. 1A shows an example of an IoT environment, which may be a home network environment. The home network environment includes a plurality of devices provided across a plurality of areas (e.g., rooms). The plurality of devices may be of the same type or different types. Examples of the devices may include televisions, voice assistant devices, lights, and the like. Examples of the plurality of areas may be a kitchen, a living room, a bedroom 1, a bedroom 2, and the like.

Figure 1B:
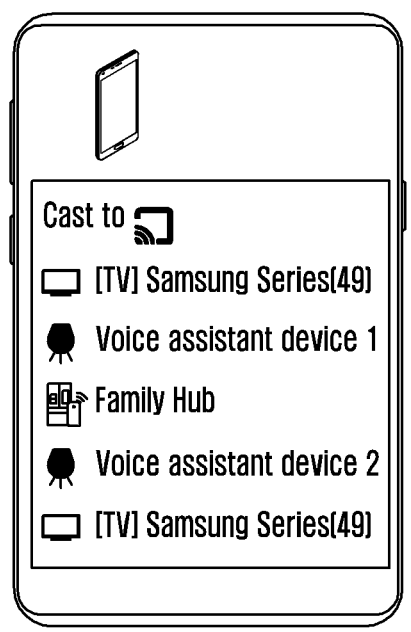

FIG. 1B shows an example scenario in which the user is in the bedroom 1 of the home network environment and the user wants to perform casting. In such a scenario, the user may be presented with the televisions and voice assistant devices that are present across the kitchen, the living room, the bedroom 1, and the bedroom 2. However, the user may be interested to detect devices that are present in the bedroom 1.

Figure 1C:
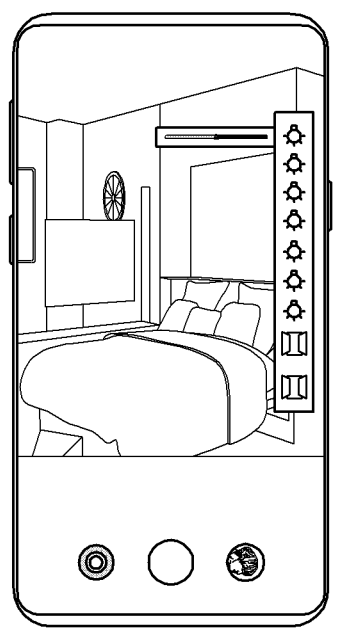

FIG. 1C shows another example scenario in which the user is in the bedroom 1 of the home network environment and the user opens a camera application on a user device to capture a picture. In such a scenario, the user may be presented with all the lights that are present across the kitchen, the living room, the bedroom 1, and the bedroom 2. However, the user may be interested to identify lights that are present in the bedroom 1 to adjust brightness of the lights present in the bedroom 1.

Figure 2A:
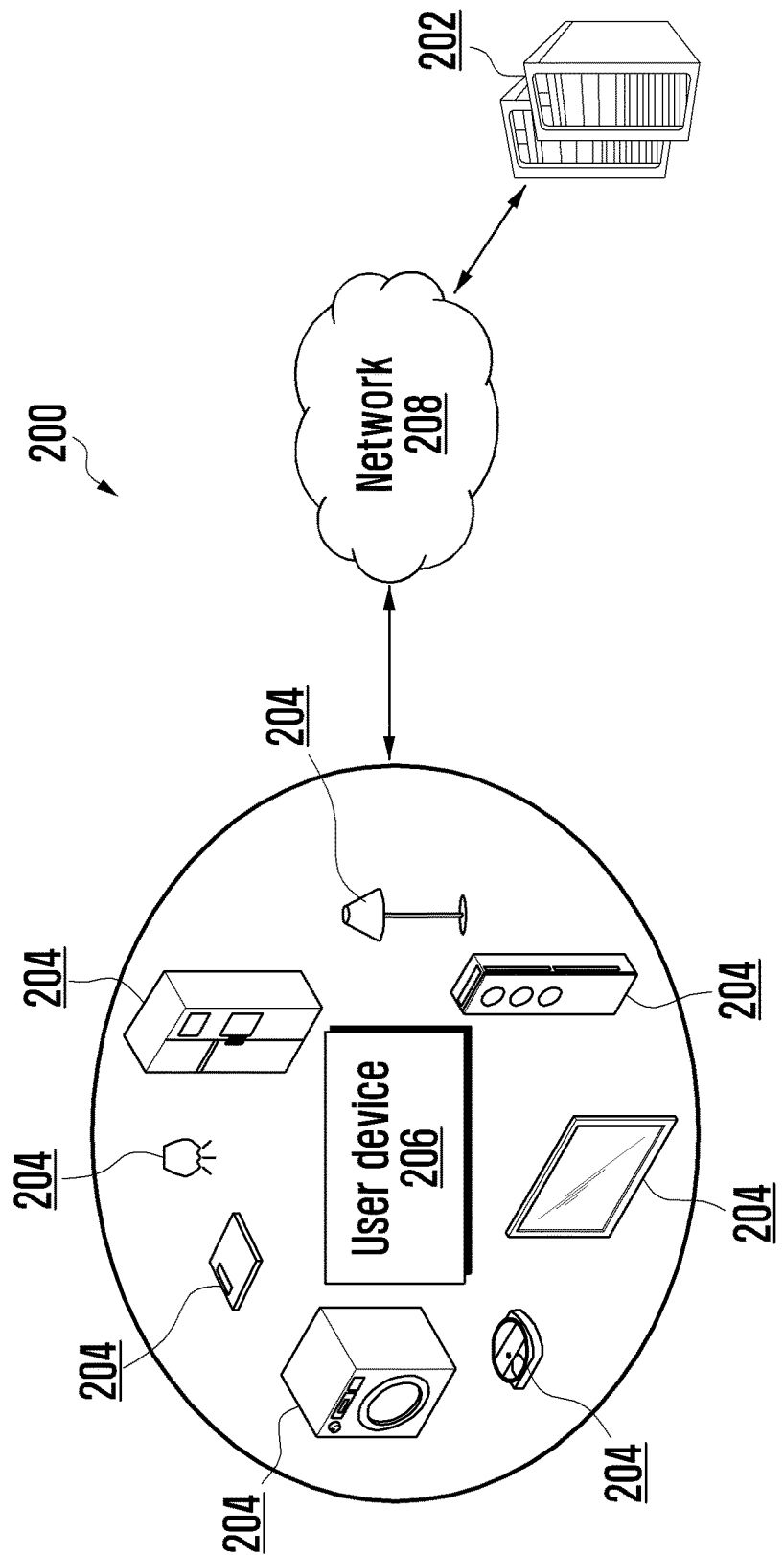
FIGS. 2A and 2B depict an IoT system, according to example embodiments.
Figure 2B:
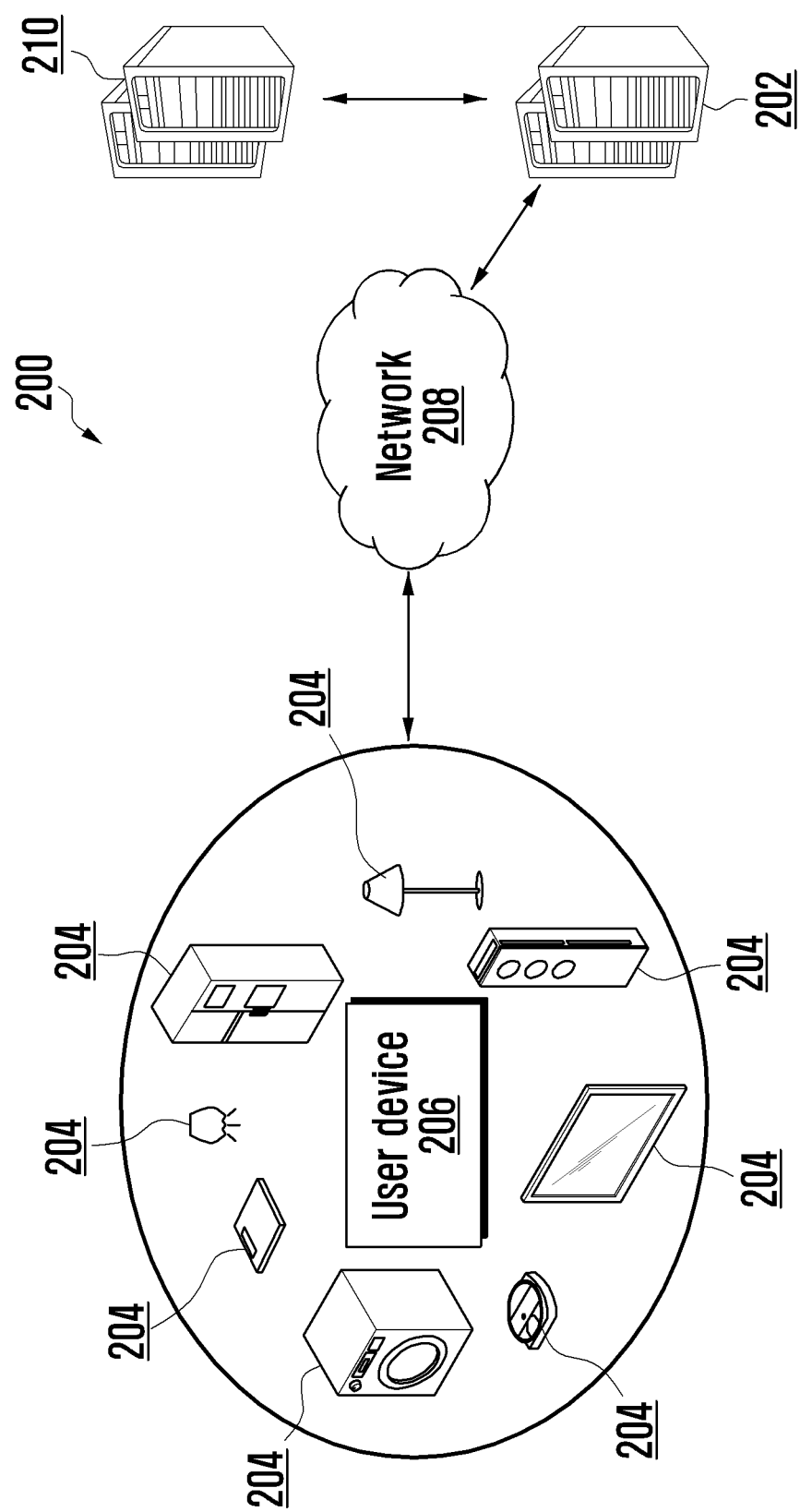

FIGS. 2A and 2B depict an Internet of Things (IoT) system 200, according to example embodiments. The IoT system 200 includes an IoT cloud server 202, a plurality of devices 204, and a user device (or client device) 206.

In an example, the user device 206, the plurality of devices 204 and the IoT cloud server 202 may be connected with each other using a communication network 208. The communication network 208 may include at least one of, but is not limited to, a wired network, a value added network, a wireless network, a satellite network or a combination thereof. Examples of the wired network may be, but is not limited to, a Local Area Network (LAN), a Wide Area Network (WAN), an Ethernet™, and the like. Examples of the wireless network may be, but is not limited to, a cellular network, a wireless LAN (e.g., Wi-Fi™), Bluetooth™, Bluetooth low energy, Zigbee™, Wi-Fi Direct (WFD), ultra-wideband (UWB), infrared data association (IrDA), near field communication (NFC). In another example, the user device 206, and the plurality of devices 204 may be directly connected with each other (for example, via a direct communication, via an access point, and the like). In another example, the user device 206 and the plurality of devices 204 may be connected to the IoT cloud server 202, and the user device 206 may be connected to the plurality of devices 204 through the IoT cloud server 202. In another example, the user device 206 may be connected to the plurality of devices 204 using the communication network 208, and the user device 206 and the plurality of devices 204 may be connected to the IoT cloud server 202 using the communication network 208. In another example, the user device 206, the plurality of devices 204 and the IoT cloud server 202 may be connected with each other via a relay and a gateway. It would be understood that the user device 206, the plurality of devices 204, and the IoT cloud server 202 may be connected to each other in any of various manners (including those described above), and may be connected to each other in two or more of various manners (including those described above) at the same time.

The IoT cloud server 202 referred herein may be a server that obtains, stores, and/or manages device information mappings (or information about device identification), functional capabilities mappings (or information about functional capabilities), and location/position information mappings (or information about location/position), and the like, of each of the plurality of devices 204 and the user device 206 present in a network environment. In an embodiment herein, the network environment may be an IoT environment including for example, but is not limited to, a smart home environment, a smart office environment, a smart hospital environment, and the like. The device information mappings include device information of (or mapped to) each of the plurality of devices 204 and the user device 206. The device information may include information such as, but is not limited to, an identification value (for example, device identifier (ID) information) of each of the plurality of devices 204 and the user device 206, a device type of each of the plurality of devices 204 and the user device 206, and the like. In an example, the identification value (or device ID information) may be, but is not limited to, a Media Access Control (MAC) identifier (MAC ID), a serial number, a device ID, and the like. The functional capability mappings include information about functional capabilities of (or mapped to) each of the plurality of devices 204 and the user device 206. Examples of the functional capabilities of the device may be, but not limited to, audio casting, video casting, music control, lights control, and the like. The location/position information mappings include information about a location/position of (or mapped to) each of the plurality of devices 204. The location/position of the device 204 may indicate an area or a room (for example, a living room, a kitchen, a bedroom, a study room, a child room, a ward, a floor, a conference room, and the like) in the IoT environment, where the device 204 is present. Embodiments herein use the terms such as "location", "position", "room", "area/region of device", and the like interchangeably to refer to a place where the device 204 is present. The IoT cloud server 202 may update the device information mappings, functional capabilities mappings, and location/position information mappings, and the like, in response to any of the plurality of devices 204 being added to or removed from the IoT environment.

The IoT cloud server 202 may also store state information of each of the plurality of devices 204 and the user device 206. The state information may include information such as, but not limited to, a power on/off state, an action (for example, video play, audio play, movie play, or the like) being performed or to be performed by each of the plurality of devices 204 and the user device 206, and the like.

The IoT cloud server 202 may obtain, determine, or generate a control command for controlling each of the plurality of devices 204 and the user device 206, by utilizing the stored mapping(s) and the state information. The IoT cloud server 202 may transmit the control command to any of the devices 204 and the user device 206 determined to perform an action based on the stored functional capability mappings. The IoT cloud server 202 may receive a result of performing the action according to the control command from the device (204, 206) that performs the operation. The IoT cloud server 202 may be configured as a hardware device independent of a server 210 described in FIG. 2B, but is not limited thereto. The IoT cloud server 202 may be a component of the server described in FIG. 2B, or may be a server designed to be classified into software.

The plurality of devices 204 and the user device 206 may be Internet of Things (IoT) devices capable of exchanging information with each other. Examples of the plurality of devices 204 and the user device 206 may be, but is not limited to, a smart phone, a mobile phone, a video phone, a computer, a tablet personal computer (PC), a netbook computer, a laptop, a wearable device, a vehicle infotainment system, a workstation, a server, a personal digital assistant (PDA), a portable multimedia player (PMP), an MP3 layer, a mobile medical device, a light, a voice assistant device, a camera, a home appliance, and the like. Examples of the home appliance may be, but is not limited to, a television, a digital video disk (DVD) player, an audio device, a refrigerator, an air conditioner, a vacuum cleaner, an oven, a microwave, a washing machine, a dryer, an air purifier, a set-top box, a home automation control panel, a security control panel, a game console, an electronic key, a camcorder, an electronic picture frame, a coffee maker, a toaster oven, a rice cooker, a pressure cooker, and the like.

The plurality of devices 204 may be provided in various locations/positions or areas or rooms in the IoT environment with which users may interact. The users may interact with the plurality of devices 204. The users may also interact or connect with the plurality of devices 204 using the user device 206. The plurality of devices 204 of a same type may be provided within the various locations/positions of the IoT environment. For example, televisions may be provided within a living room, and a bedroom in the IoT environment. In another example, the plurality of devices 204 of different types may be provided within various locations/positions of the IoT environment.

The user device 206 may be a device that is used by the user to connect, and/or interact, and/or control the plurality of devices 204 or to perform the action on the plurality of devices 204. Embodiments herein use the terms "user device", "client device", "first device", "first IoT device", and the like, interchangeably to refer to a device that is used by the user. Embodiments herein use the terms "devices", "IoT devices", "second devices", "second IoT devices", and the like, interchangeably to refer to devices with which the user may interact, connect and/or perform the action using the user device 206.

The plurality of devices 204 and the user device 206 may be registered with the IoT cloud server 202 by communicating the device information, the functional capabilities, and the location/position information to the IoT cloud server 202, when provided in the IoT environment. In an example, the plurality of devices 204 and the user device 206 may include an application (for example, an onboarding application) provided by the IoT cloud server 202, which may be used to register with the IoT cloud server 202. In another example, the user may register each of the plurality of devices 204 with the IoT cloud server 202 using an application present on the user device 206. The plurality of devices 204 and the user device 206 may also communicate the state information thereof to the IoT cloud server 202. In an example, the plurality of devices 204 and the user device 206 may continuously communicate the state information to the IoT cloud server 202. In another example, the plurality of devices 204 and the user device 206 may communicate the state information to the IoT cloud server 202 at a periodic interval of time. In another example, the plurality of devices 204 and the user device 206 may communicate the state information to the IoT cloud server 202 in response to an occurrence of pre-defined events. The pre-defined events may include at least one of, for example but not limited to, streaming of videos, playing audio, and the like.

The plurality of devices 204 and the user device 206 may be configured to perform one or more actions (or operations) based on their functional capabilities. The actions may include IoT actions such as, but not limited to, casting, video play, music play, e-mailing, weather information reception, news information display, game play, capturing of media (an image, a video, or the like), and the like.

The user device 206 may receive an input of the user. In an example, the input may be launching/opening of an application on the user device 206. The application may include at least one of, but is not limited to, a video streaming application, a music application, a casting application, a camera application, a navigation application, a device controlling application, a weather application, and the like. In another example, the input may be opening the onboarding application on the user device 206. In another example, the input may be a change in user behavior/movement with respect to an action that is being performed on any one of the plurality of devices 206. (for example, a user moves from a living room to a kitchen and stops watching a movie on a television present in the living room).

The user device 206 detects an initiation of the action that corresponds to the received input of the user. In an embodiment, the action may include at least one of, an action associated with the application present on the user device 206. Examples of the action may be, but not limited to, audio casting, video casting, capturing the media, and the like. In another embodiment, the action may include registering/onboarding one of the plurality of devices 204 with the IoT cloud server 202. In another embodiment, the action may include continuing the action/session being performed on one of the plurality of devices 204 on another device 204, wherein another device 204 is positioned in the location where the user has moved.

On detecting the action initiated by the user, the user device 206 determines the functional capability (or capabilities) that may be used to perform the action initiated by the user. The functional capability may include at least one of audio casting, video casting, music control, lights control, and the like. In an embodiment, if the action initiated by the user includes onboarding the device 204, the user device 206 determines an audio capability as the functional capability to be used to perform the action (onboarding). If the user device 206 fails to onboard the device 204 with the IoT cloud server 202 based on the audio capability, the user device 206 determines a light capability as the functional capability to onboard the device. For the ease of description and better understanding of the embodiments, the audio and the light may be described as examples of the functional capabilities for onboarding the device 204. It should be noted that the embodiments of the disclosure are not limited to the audio and light capabilities and any other functional capabilities, individually or in any combination thereof, may be included.

Figure 3:
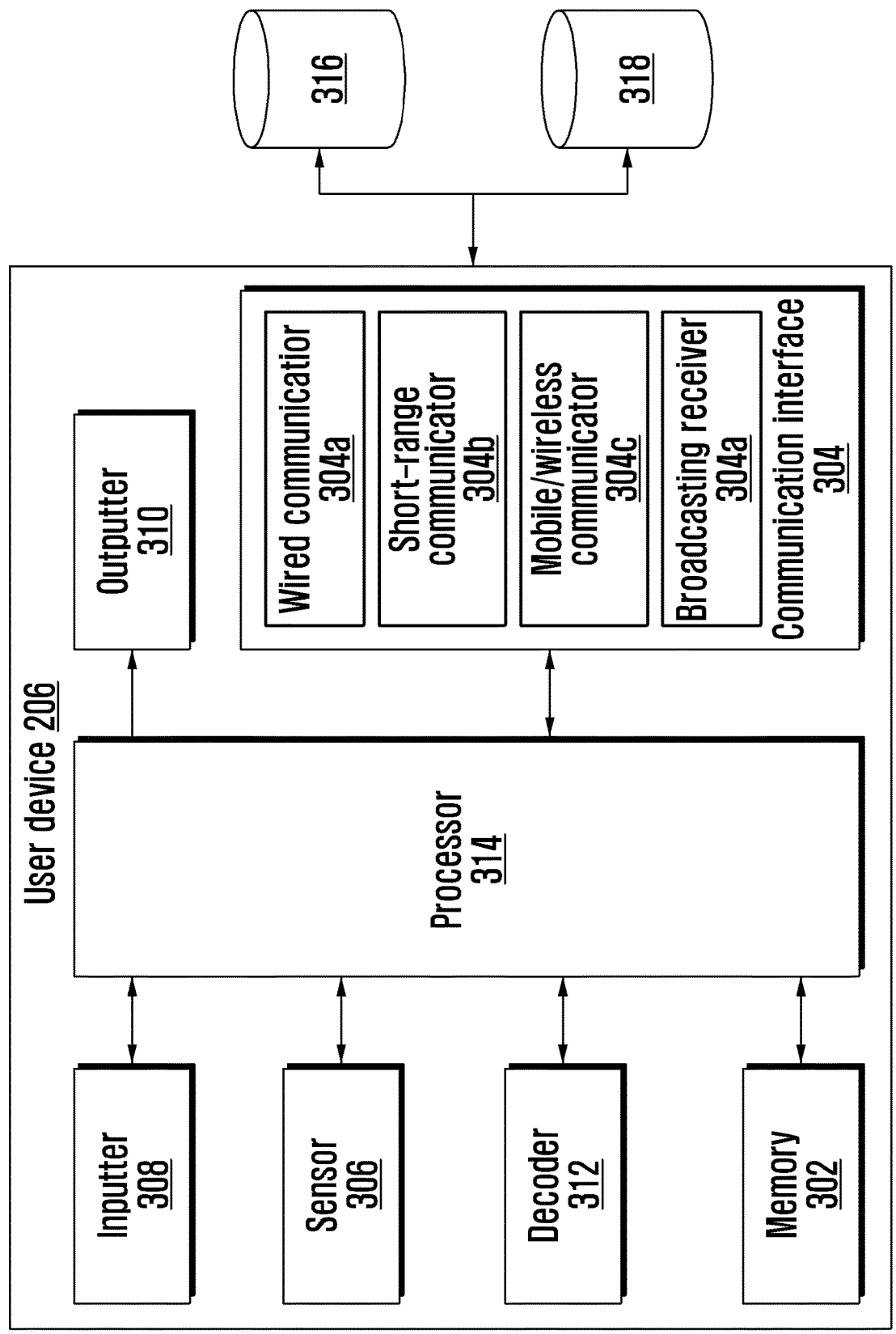
FIG. 3 is an example block diagram depicting a user device to identify devices in an IoT environment, according to example embodiments.

The user devices 206 determines at least one device 204 that may include the determined functional capability to perform the initiated action. In an embodiment, the user device 206 may access the functional capabilities mappings from the IoT cloud server 202 and determines the at least one device 204 that may include the determined functional capability. In another embodiment, the user device 206 may maintain a functional capabilities database (or first database) 316 (as depicted in FIG. 3) and store the functional capabilities mappings received from the IoT cloud server 202 in the functional capabilities database 316. The user device 206 accesses the functional capabilities mappings from the functional capabilities database 316 and determines the at least one device 204 that may include the determined functional capability.

The user device 206 generates device type watermarks for the determined at least one device 204 that includes the functional capability to perform the initiated action. The user device 206 may generate the device type watermark for each device 204 of the determined at least one device 204 based on the functional capability of the corresponding device 204. The device type watermark of each device 204 may be a unique signature indicating the functional capability of the corresponding device 204. In an embodiment, the device type watermark may include watermarks such as, but is not limited to, an audio watermark, a light watermark, or a combination thereof. The user device 206 may generate the audio watermark for the devices 204 that include the audio capability. In an example, the user device 206 may generate the audio watermark for the devices 204 such as, but is not limited to, a television, a voice assistant device, a family hub, and the like. The user device 206 may generate the light watermark for the devices that include the light capability. The user device 206 may generate the audio watermark in combination with the light watermark for the devices 204 (without having the functional capability of the audio casting, and the lights control) that may operate in conjunction with the devices that include the audio capability and the light capability. For the ease of description and better understanding of the embodiments, the audio watermark and the light watermark may be described as examples of the device type watermark. It should be noted that the embodiments of the disclosure are not limited to the audio watermark and the light watermark and any other device type watermarks may be generated to indicate the functional capability of the device 204 to be used to perform the initiated action.

The audio watermark may be a pattern array including sound waves (for example, ultrasound waves, or the like) with frequencies higher than an upper audible limit of human hearing. The frequencies may include or may not include a message (for example, a random message like a "hello" message, or the like). The sound waves included in the audio watermark may include similar physical properties of normal (audible) sound, except that the user/human may not hear the sound waves. Thus, the audio watermark may not be heard by the user/human and may not be traveled through opaque objects (for example, walls, doors, and the like) in the network environment. The audio watermark may have a short distance of transmission, which depends on a transmitter of the device that indicates (or exhibits) the audio watermark. In an example, the audio watermark may have approximately 8 to 12 meters distance of transmission (transmittable to a distance of approximately 8 to 12 meters from the transmitting device). The audio watermark may be detected using a microphone.

The light watermark may be a pattern array including properties of light such as, but not limited to, brightness, color variations, power ON/OFF, and the like. In an example, the light watermark may include at least one of, but is not limited to, a brightness watermark, a color watermark, an ON-OFF watermark, and the like. The light watermark may not be travelled through the opaque objects in the network environment. The light watermark may be detected using at least one of, but is not limited to, a camera, a photosensor, and the like.

The user device 206 maintains a device type watermark creator database (or second database) 318 (as depicted in FIG. 3) and stores device type watermark mappings in the device type watermark creator database 318. The device type watermark mappings may include mappings of the devices 204 with the associated device IDs and the generated device type watermarks for the devices 204. The user device 206 may access the device IDs of the devices 204 from the IoT cloud server 202.

In response to generating the device type watermark for each of the devices 204 that includes the functional capability to perform the initiated action, the user device 206 generates time slots for the devices 204 to indicate the generated device type watermarks. The time slot generated for each device 204 may indicate a time and/or a duration to indicate (e.g., exhibit) the generated device type watermark by the device 204. Therefore, the device type watermarks indicated by the devices 204 may not overlap/interfere with each other. In an embodiment, the user device 206 may use a clock synchronization method to generate the time slots for the devices 204 for which the device type watermarks are to be indicated by the devices 204. The user device 206 transmits a request to the IoT cloud server 202 to provide the generated device type watermark and the associated time slot for each of the devices 204. The IoT cloud server 202 provides the received device type watermark and the associated time slot to each of the devices 204 and requests each device 204 to indicate its device type watermark in the corresponding time slot.

The user device 206 may receive/listen to the device type watermarks from the devices 204 in the various time slots. The user device 206 may or may not receive the device type watermarks from all the devices 204 for which the device type watermarks have been generated. In an example, the user device 206 may receive the device type watermarks from the devices 204 that are present in a same area (for example, within a same room) of the user device 206 or present in proximity to the user device 206.

The user device 206 analyzes the received device type watermarks and converts/decodes the received device type watermarks into respective device IDs. The user device 206 may include decoders for decoding the received device type watermark into the respective device IDs. In an example, the user device 206 may use an ultrasound decoder to decode the audio watermark into the device ID and/or a light decoder to decode the light watermark into the device ID. The user device 206 identifies the devices associated with decoded device IDs. The user device 206 may access the device type watermark mappings from the device type watermark creator database 318 and identifies the devices 204 associated with the decoded device IDs. The identified devices 204 may be present within the same location/room of the user device 206 or in proximity to the user device 206.

In an embodiment, in response to identifying the devices 204, the user device 206 may recommend the identified devices 204 to the user for performing the initiated action, if the initiated action (for example, the audio casting, the video casting, the media capture, or the like) is associated with the application on the user device 206. In an example, the user device 206 may recommend the identified devices 204 by displaying the identified devices 204 on the application that has been launched or that is being used by the user. Thus, the device(s) 204 of interest to the user may be recommended by filtering the other devices 204 (that may be of no interest to the user), which enhances the user experience.

In another embodiment, in response to identifying the devices 204, the user device 206 may determine the location/position of each of the identified devices 204, if the user action includes onboarding/registering the device 204. The user device 206 may access the location/position information mappings from the IoT cloud server 202 and determines the location/position of each of the identified devices 204. In response to determining the location/position of each of the identified devices 204, the user device 206 determines if the locations/positions associated with all the identified devices 204 are same. If the locations/positions associated with all the identified devices 204 are same, the user device 206 assigns the position (for example, a room, a floor, or the like) of any of the identified devices 204 to the device 204 that needs to be registered/onboarded. If the locations/positions associated with all the identified devices 204 are not same, the user device 206 determines the location/position associated with a highest number of devices 204 and assigns the corresponding location/position to the device 204 that needs to be registered/onboarded. In response to assigning the location/position to the device 204, the user device 206 registers the device 204 with the IoT cloud server 202 by providing the location/position information of the device 204.

In another embodiment, in response to identifying the devices 204, the user device 206 selects one of the identified devices 204 and enables the selected device 204 to continue the action, if the initiated action includes continuing the corresponding action. The action may be an action which is being performed on one of the plurality of devices 204. The user device 206 may enable the selected device 206 to continue the action using the state information of one of the plurality of devices 204 on which the action is being performed. The user device 206 may access the state information of one of the plurality of devices 204 from the IoT cloud server 202.

In an embodiment, as depicted in FIG. 2B, the server 210 may be configured to perform at least one intended function of the user device 206. The server 210 referred herein may be a standalone server or a cloud server. In an example, the server 210 may connect with the IoT cloud server 202, the user device 204, and the plurality of devices 204 through the communication network 208. In another example, the server 210 may connect with the IoT cloud server 202 and the user device 206 and connect with the plurality of devices 204 through the IoT cloud server 202. The server 210 may receive information about the action initiated by the user from the user device 206. The server 210 may identify the device(s) 204 for performing the user action and recommend the identified devices 204 to the user device 206 to be displayed to the user, if the action initiated by the user includes one of, for example but not limited to, the audio casting, the video casting, the media capture, and the like. The server 210 may enable the device 204 to continue the action that is being performing on another device, if the action initiated by the user includes one of continuing the action on the device 204. The server 210 may determine the location/position of the device 204 for onboarding, if the action initiated by the user includes onboarding the device 204 with the IoT cloud server 202. The server 210 may recommend the devices 204 to the user, enable the devices 204 to continue the action that is being performed on another device 204, and/or identify the location/position of the device 204 for onboarding.

FIGS. 2A and 2B show example configurations of the IoT system 200, but it is to be understood that other embodiments are not limited thereon. In other embodiments, the IoT system 200 may include less or more number of blocks. Further, the labels or names of the blocks are used only for illustrative purpose and does not limit the scope of the embodiments herein. One or more blocks may be combined together to perform same or substantially similar function in the IoT system 200.

FIG. 3 is an example block diagram depicting various components of the user device 206 to identify the devices in the IoT environment, according to example embodiments. Embodiments herein describe components of the user device 206, but it would be understood by a person skilled in the art that the device 204 and the server 210 may include similar components.

The user device 206 (or the plurality of devices 204 or the server 210) may include a memory 302, a communication interface 304, a sensor 306, an inputter (or an input interface) 308, an outputter (or an output interface) 310, a decoder 312, and a processor (or controller) 314. The user device 206 may also be coupled with the functional capabilities database 316 and the device type watermark creator database 318. The user device 206 may obtain the functional capability mappings from the IoT cloud server 202 and store the obtained functional capability mappings in the functional capabilities database 316. The user device 206 may update the functional capabilities database 316, upon receiving the functional capabilities mappings from the IoT cloud server, continuously or at periodic time intervals, or on an occurrence of pre-defined conditions. The pre-defined conditions may include registering of new device(s) 204 with the IoT cloud server 202, updating of the functional capabilities mappings on the IoT cloud server 202, or the like. The user device 206 may store the device type watermark mappings in the device type watermark creator database 318.

Figure 4:
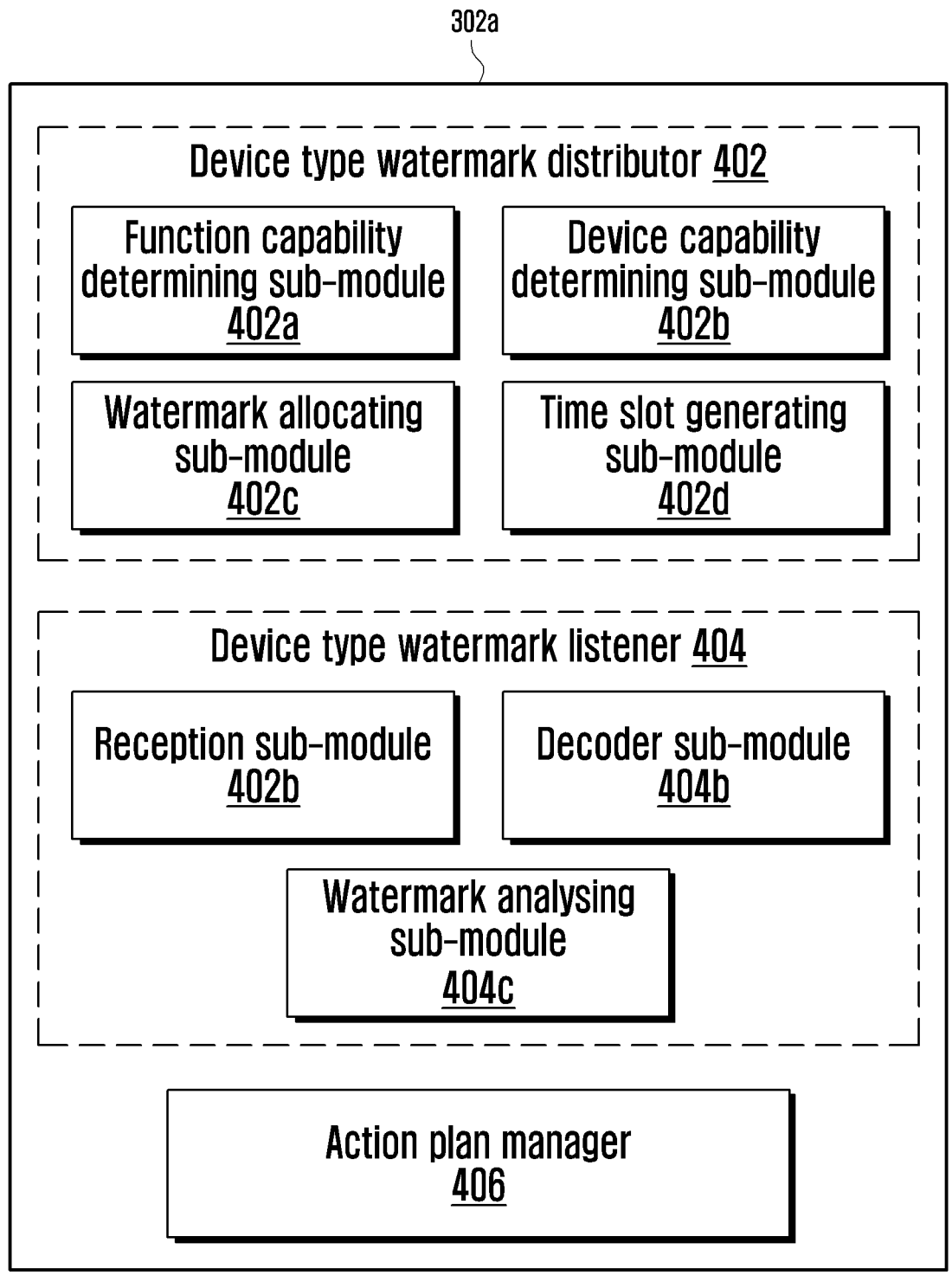
FIG. 4 is an example diagram depicting a device identification module executable in a user device, according to example embodiments.
Figure 5:
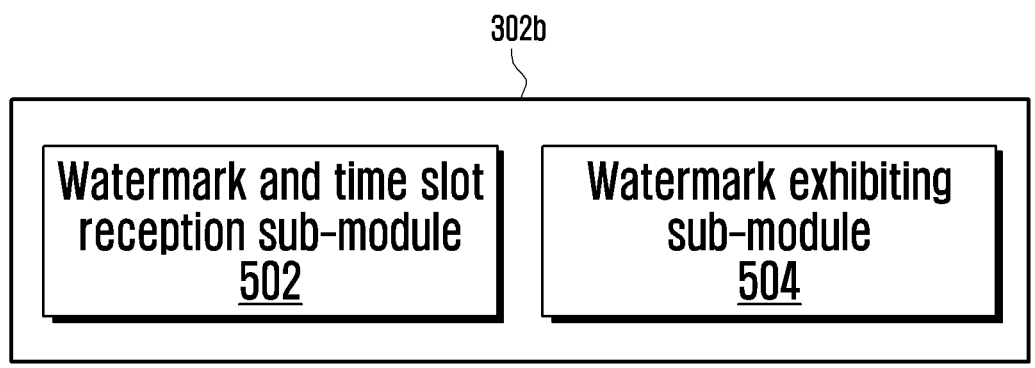
FIG. 5 is an example diagram depicting a watermark indicating module executable in a user device, according to example embodiments.

The memory 302 may store at least one of, but is not limited to, the applications that may be used by the user for performing the action, mappings of the inputs with the actions, the device information, the devices 204 recommended for the user, the device type watermarks and the associated time slots, and the like. The memory 302 may also store a device identification module 302a (as shown in FIG. 4) that is executable by the processor 314 for at least one of, for example but not limited to, recommending the device(s) 204, enabling the device(s) 204 to continue the action that is being performed on another device 204, onboarding the device 204, and the like. The memory 302 may also store a watermark exhibiting (or indicating) module 302b (as shown in FIG. 5), that is executable by the processor 314 to indicate the device type watermark. The memory 302 may include at least one type of storage medium, from among a flash memory type storage medium, a hard disk type storage medium, a multi-media card micro type storage medium, a card type memory (for example, an SD or an XD memory), a random-access memory (RAM), a static RAM (SRAM), a read-only memory (ROM), an electrically erasable programmable ROM (EEPROM), a programmable ROM (PROM), a magnetic memory, a magnetic disk, or an optical disk.

The communication interface 304 may include one or more components in which the user device 206 communicates with another device (for example, another user device 206, the IoT cloud server 202, the plurality of devices 204, the server 210, and the like) using data communication methods that are supported by the communication network 208. The communication interface 304 may include components such as, a wired communicator 304a, a short-range communicator 304b, a mobile/wireless communicator 304c, and a broadcasting receiver 304d.

The wired communicator 304a may enable the user device 206 to communicate with the other devices (for example, another user device 206, the IoT cloud server 202, the plurality of devices 204, or the like) using the communication methods such as, but not limited to, wired LAN, the Ethernet™, and the like. The short-range communicator 304b may enable the user device 206 to communicate with the other devices using the communication methods such as, but is not limited to, Bluetooth low energy (BLE), near field communicator (NFC), WLAN (e.g., Wi-Fi™), Zigbee™, infrared data association (IrDA), Wi-Fi direct (WFD), Ultra-wide band communication, Ant+™ (interoperable wireless transfer capability) communication, shared wireless access protocol (SWAP), wireless broadband internet (Wibro), wireless gigabit alliance (WiGiG), and the like. In an embodiment, the user device 206 may obtain the location information/position information of the user device 206 through the short-range wireless communicator 304b. In an example, the user device 206 may determine a location/position, where the user device 206 is located through an NFC tag. In another example, the user device 206 may determine a location/position, where the user device 206 is located through an identifier of Wi-Fi™. In another example, the user device 206 may determine the location/position, where the user device 206 is located by confirming a service set identifier (SSID) of the Wi-Fi™ to which the user device 206 has been connected. The mobile communicator 304c may transmit/receive wireless signals with at least one of a base station, an external terminal, or a server on a mobile communication network/cellular network. In an example, the wireless signal may include a speech call signal, a video telephone call signal, or various types of data, according to transceiving of text/multimedia messages. The broadcasting receiver 304d may receive a broadcasting signal and/or broadcasting-related information from the outside through broadcasting channels. The broadcasting channels may include satellite channels and ground wave channels. In an embodiment, the user device 206 may or may not include the broadcasting receiver 304d.

The sensor 306 may be configured to detect a state of the user device 206, or a state around the device 206 and transmit detected state information to the processor 314. The sensor 306 may also be configured to capture the user behavior. The sensor 306 may also be configured to generate the location/position information of the user device 206. Examples of the sensor 306 may be, but is not limited to, a magnetic sensor, an acceleration sensor, a temperature/humidity sensor, an infrared sensor, a gyroscope sensor, a positioning sensor (for example, a global positioning sensor (GPS)), an atmospheric sensor, a proximity sensor, an RGB sensor (a luminance sensor), a photosensor, a thermostat, or any other equivalent sensor. A function of each sensor may be intuitively inferred by one of ordinary skill in the art based on its name, and thus, its detailed description is omitted.

The inputter 308 may be configured to receive the input from the user. The input may be an input for performing the action. Also, the input may be an input for controlling the user device 206. The input may include at least one of, but not limited to, an input for launching the application, an input of user behavior, a speech input, and the like. In an example, the inputter 308 may include one of, a keypad, a dome switch, a microphone, a touch pad (implementing, for example, at least one of a touch capacitance method, a pressure resistive method, an infrared detection method, a surface ultrasonic conductive method, an integral tension measuring method, a piezo effect method, or the like), a jog wheel, a jog switch, or any other means that may receive the input from the user. The inputter 308 may operate in conjunction with the sensor 306 to receive information about the user behavior (as an example of the input). The inputter 308 may also include an audio/video (A/V) inputter that may be configured to input an audio signal and/or a video signal. The A/V inputter may include a camera, a photosensor, a microphone, or the like. The camera may obtain an image frame, such as a still image or a moving image, through an image sensor, in a video telephone mode or a capturing mode. The image captured by the image sensor may be processed by the processor 314 or an additional image processor. The microphone may receive an external sound signal and process the received external sound signal into electrical voice data. In an example, the microphone may receive a speech signal from the user. The microphone may receive a speech input of the user. The microphone may use various noise removal methods for removing noise generated in a process of receiving external sound signals.

The inputter 308 may also be configured to receive the device type watermarks indicated by the devices 204. In an example, the inputter 308 may use the microphone to receive the audio watermarks indicated by the devices 204. In another example, the inputter 308 may use the photosensor/camera to receive the light watermarks indicated by the devices 204. In another example, the inputter 308 may use the microphone in combination with the photosensor/camera to receive the audio watermarks in combination with the light watermarks.

The outputter 310 may be configured to provide an output to the user. The output may indicate at least one of, for example but not limited to, the devices 204 recommended for the user, the location/position of the device that needs to be onboarded, and the like. The outputter 310 may include for example, but is not limited to, a sound outputter, a display, a vibration motor, a User Interface (UI) module, a light emitting device, and the like, to provide the output to the user. In an example, the output may be provided as, but is not limited to, an audio signal, a video signal, a vibration signal, text, and the like. The sound outputter may be a speaker that receives the output from the controller and provides the output as the audio signal to the user. The display receives the output from the controller and displays the output as at least one of, the video signal, the text, or the like to the user. The UI module may provide a specialized UI or graphics user interface (GUI), or the like, synchronized to the user device 206, according to the applications.

The outputter 310 may also be configured to indicate the device type watermark in the corresponding time slot, if the user device 206 has received the device type watermark and the associated time slot from another device through the IoT cloud server 202. In an example, the outputter 310 may use the speaker to indicate the audio watermark. In another example, the outputter 310 may use the light emitting device to indicate the light watermark.

The decoder 312 may be configured to decode the received device type watermarks (e.g., received via the inputter 308) into the device IDs. The decoder 312 may include at least one of, but is not limited to, an ultrasound decoder, a light decoder, and the like. In an example, the ultrasound decoder may decode the received audio watermark into the device ID. In another example, the light decoder may convert the received light into the device ID.

The processor 314 may be configured to control all the components of the user device 206. The processor 314 may also be configured to execute the device identification module 302a for recommending the device(s) 204, enabling the device(s) 204 to continue the action that is being performed on another device, onboarding the device 204, and the like.

The processor 314 may receive the input from the inputter 308 and/or the sensor 306. The input may include at least one of the input for launching of the application to perform the action, the input for onboarding device 204, the change in the user behavior (for example, the change in the user movement) with respect to the action being performed on one of the plurality of devices 204, or the like. The processor 314 may detect the action initiated by the user, based on the input received from the user. The action may include the action that may be performed using one of the plurality of devices 204 and such an action includes at least one of, but not limited to, the audio casting, the video casting, the media capture, and the like. The action may also include onboarding the device 204. The action may also include continuing of the current action being performed in any other device 204 on any one of the plurality of devices 204 that is present in the location/position, to which the user has been moved.

The processor 314 determines the functional capability to be used to perform the action initiated by the user. The processor 314 accesses the mapping of the functional capabilities associated with the inputs from the memory 302 and determines the functional capability to perform the initiated action. The processor 314 determines the devices 204 that may include the functional capability to be used to perform the action. The processor 314 may communicate with the IoT cloud server 202 or the functional capabilities database 316 through the communication interface and access the functional capabilities mappings. The functional capabilities mappings include the functional capabilities of each of the plurality of devices 204. The processor 314 may use the accessed the functional capability mappings and determine the devices 204 that may include the functional capability to perform the initiated action on the user device 206.

The processor 314 generates the device type watermarks for all the devices 204 that include the functional capability to perform the action initiated by the user. The processor 314 generates the device type watermarks (for example, the audio watermark, the video watermark, or the like) for the devices 204 based on the functional capability of each of the devices 204. The processor 314 may request the IoT cloud server 202 to transmit the device IDs of the devices 204 for which the device type watermarks have been generated. The IoT cloud server 202 may identify the device IDs for the requested devices 204 using the device information mappings and transmit the identified device IDs to the processor 314. Based on receiving the device IDs of the user devices 206, the processor 314 updates the device type watermark mappings stored in the device type watermark creator database 318 with the mappings of the devices 204 including the associated device IDs and the generated device type watermarks for the devices 204.

The processor 314 generates the time slots for the devices 204 to indicate the generated device type watermarks. The processor 314 transmits the device type watermarks and the associated time slots of the devices 204 to the IoT cloud server 204 through the communication interface 304. The IoT cloud server 204 communicates the device type watermarks and the associated time slots to the respective devices 204 and requests the corresponding devices 204 to indicate the device type watermarks in the associated time slots.

The processor 314 may also receive the device type watermarks indicated by the devices 204 in the various time slots from the inputter 308. Herein, the processor 314 may or may not receive the device type watermarks from all the devices 204 for which the device type watermarks have been generated. The processor 314 decodes the received device type watermarks into the device IDs using the decoder 312 and identifies the devices 204 associated with the decoded device IDs. The processor 314 may access the device type watermark mappings from the device type watermark creator database 318 and identifies the devices 204 associated with the decoded device IDs. The identified devices 204 may be present in proximity to or within the same location/position of the user device 206.

In an embodiment, the processor 314 may recommend the identified devices 204 to the user for performing the initiated action. The recommended devices 204 may be of interest to the user. The processor 314 enables the outputter 310 to provide the identified devices 204 as the output to the user for performing the initiated action. Thus, the user may select any of the recommend devices 204 to perform at least one of the audio casting, the video casting, the media capture, and the like.

In another embodiment, the processor 314 may select one of the identified devices 204 and enable the selected device 204 to continue the action that is being left off by the user on another device 204. The processor 314 may identify the action that is being performed on another device 204 using the state information of the devices 204 (that may be received from the IoT cloud server 202) and enables the selected device 204 to continue the identified action.

In another embodiment, the processor 314 may determine the location/position information of the identified devices 204. If the location/position information of the identified devices is same, the processor 314 may assign the location/position for the device 204 that needs to be onboarded by the user. If the location/position information of the identified devices 204 is not same, the processor 314 may determine the location/position that is same as a highest number of devices 204. The processor 314 may assign determined position for the device 204 that needs to be onboarded by the user. The processor 314 onboards/registers the device 204 with IoT cloud server 202 by communicating the device information and the location/position information to the IoT cloud server 202 through the communication interface 304.

In an embodiment, the processor 314 receives the device type watermark and the time slot generated by another device (e.g., 202, 204) through the IoT cloud server 202. In such a scenario, the processor 314 executes the watermark indicating module 302*b* to indicate the received device type watermark in the indicated time slot.

FIG. 4 is an example diagram depicting the device identification module 302*a* executable in the user device 206, according to example embodiments.

The device identification module 302*a* may be configured to perform at least one of recommending the device(s) 204 for performing the action, enabling the device(s) 204 to continue the action that is being performed on another device 204, and onboarding the device 204. The device identification module 302*a* may include a device type watermark distributor 402, a device type watermark listener 404, and an action plan manager 406.

The device type watermark distributor 402 may be configured to generate the device type watermarks for the devices 204. The device type watermark distributor 402 may include a functional capability determining sub-module 402*a*, a device capability determining sub-module 402*b*, a watermark allocating sub-module 402*c*, and a device clock synchronizer/time slot generating sub-module 402*d*.

The functional capability determining sub-module 402*a* may be configured to determine the action initiated by the user on the user device 206. The functional capability determining sub-module 402*a* receives the input of the user from the inputter 308 and detects the action that is of interest to the user or initiated by the user. The functional capability determining sub-module 402*a* accesses the mapping of the inputs and the actions from the memory 302 and determines the action corresponding to the received input. The functional capability determining sub-module 402*a* determines the functional capability to be used to perform the determined action. In an example, if the input of the user indicates that the user has launched a casting application on the user device 206, the functional capability determining sub-module 402*a* determines that the functional capability, such as, but not limited to, the audio play/capability, the video play/capability, or the like, to be used to perform the casting. In another example, if the input of the user indicates that a user starts moving towards a kitchen from a living room, in which the user was watching a movie, the functional capability determining sub-module 402*a* determines the functional capability, such as, but not limited to, the audio play, the video play, or the like as to play the movie on another device 204. In another example, if the input of the user indicates that the user has launched an onboarding application on the user device 206 to onboard the device 204 with the IoT cloud server 202, the functional capability determining sub-module 402*a* determines the audio capability as the functional capability to perform the onboarding of the device 204. If the onboarding of the device 204 fails using the audio capability, the functional capability determining sub-module 402*a* determines the light capability as the functional capability to perform the onboarding of the device 204. In an example, in case of the onboarding of the device 204, the audio capability may be assigned with the highest priority, compared to the light capability. The functional capability determining sub-module 402*a* provides information about the functional capability to be used to perform the action.

The device capability determining sub-module 402*b* may be configured to determine the devices from the plurality of devices 204 that include the functional capability to be used to perform the action that is of interest to the user or initiated by the user. In an embodiment, based on receiving the information about the functional capability from the functional capability determining sub-module 402*a*, the device capability determining sub-module 402*b* accesses the functional capabilities mappings from at least one of the IoT cloud server 202 and the functional capabilities database 316. The device capability determining sub-module 402*b* uses the accessed functional capabilities mappings and determines the devices 204 that may include the functional capability to perform the action. In an example, if the functional capability includes the audio capability, the device capability determining sub-module 402*b* may determine the devices 204, such as, but is not limited to, a television, a voice assistant, a family hub, or any other device that supports the audio capability. In another example, if the functional capability includes the light capability, the device capability determining sub-module 402*b* may determine the devices 204, such as, but not limited to, lights, a camera device, or any other device that supports the light capability. The device capability determining sub-module 402*b* provides information about the determined devices 204 and the associated functional capability to the watermark allocating sub-module 402*c*.

The watermark allocating sub-module 402*c* may be configured to generate the device type watermarks for the devices 204 that include the functional capability to perform the action. Based on receiving the information about the devices 204 and the associated functional capability, the watermark allocating sub-module 402c determines the functional capability associated with each of the devices 204 and generates the device type watermark for each of the devices 204. In an embodiment, the watermark allocating sub-module 402c generates the device type watermarks, such as, but is not limited to, the audio watermark, the light watermark, or a combination thereof. In an example, if the device 204 includes the audio capability, the watermark allocating sub-module 402c generates the audio watermark for the device 204, by creating an ultrasound pattern array (that may or may not include a random message). In another example, if the device 204 includes the light capability, the watermark allocating sub-module 402c generates the light watermark for the device 204, by creating at least one of, brightness, color, ON-OFF, or the like, pattern array. In an example, if the device 204 is a sensor or any other device 204 that may operate with the devices 204 that include the audio capability and the light capability, the watermark allocating sub-module 402c generates the audio watermark and the light watermark for the device 204.

Based on generating the device type watermarks for the devices 204, the watermark allocating sub-module 402c requests the IoT cloud server 202 for the device IDs of the devices 204 for which the device type watermarks have been generated. Based on receiving the device IDs of the devices 204 from the IoT cloud server 202, the watermark allocating sub-module 402c updates the device type watermark mapping stored in the device type watermark creator database 318 with the mappings of the devices 204 with the associated device IDs and the generated device type watermarks for the devices 204. The watermark allocating sub-module 402c provides information about the generated device type watermark for each of the devices 204 to the time slot generating sub-module 402d.

The time slot generating sub-module 402d may be configured to generate the time slot for each of the devices 204 for which the device type watermarks have been generated. The time slot generating sub-module 402d may use a clock to generate the time slot for each of devices 204. The time slot generating sub-module 402d may enable the clock to generate the time slot for each of the device type watermarks using suitable clock synchronization methods. The clock synchronization methods may be intuitively inferred by one of ordinary skill in the art based on its name, and thus, its detailed description is omitted. The time slot may include the duration and/or time. The time slot generated for each device 204 may inform the device 204 about the duration and time in which the device type watermark is to be indicated. Therefore, the devices 204 may indicate the device type watermarks without inference/overlapping with other devices 204. In an example, the audio watermark or the light watermark is created for a device 1, a device 2, and a device 3. In such a scenario, the time slot generating sub-module 402d may generate a time slot of T1 milliseconds (ms) for the device 1, a time slot of T1+200 ms for the device 2 and a time slot of T1+400 ms for the device 3 to indicate (e.g., exhibit) the respective audio/light watermarks. Thus, the device type watermarks may not interfere with each other, even if the device type watermarks have been generated for the multiple functional capabilities (for example, the audio, the light, or the combination thereof). The time slot generating sub-module 402d requests the IoT cloud server 202 to send the device type watermarks and the associated time slots to the respective devices 204.

The device type watermark listener 404 may be configured to receive and analyze the device type watermarks from the devices 204. The device type watermark listener 404 includes a reception sub-module 404a, a decoder sub-module 404b, and a watermark analyzing sub-module 404c.

The reception sub-module 404a may be configured to receive the device type watermarks indicated by the devices 204 in the various generated time slots. The reception sub-module 404a may or may not receive the device type watermarks from all the devices 204 for which the device type watermarks have been generated and communicated. The reception sub-module 404a may enable the inputter 308 to receive the device type watermarks. The inputter 308 may include at least one of, but is not limited to, the microphone, the camera, the photosensor, and the like to receive the device type watermarks indicated by the devices 204. In an example, the microphone may receive/capture the audio watermarks indicated by the devices 204 and the camera/photosensor may receive the light watermarks indicated by the devices 204. The reception sub-module 404a may provide information about the received device type watermarks to the decoder sub-module 404b.

The decoder sub-module 404b may be configured to decode/convert the received device type watermarks into the device IDs. The device IDs may indicate random numbers, which have been associated with the devices 204. The decoder sub-module 404b may use the decoder 312 to decode the received device type watermarks into the device IDs. In an example, the decoder sub-module 404b may use the ultrasound decoder to decode the audio watermarks into the device IDs and the light decoder such as, the camera, the photosensor, but not limited thereto, to decode the light watermarks into the device IDs. The decoder sub-module 404b may provide the decoded device IDs to the watermark analyzing sub-module 404c.

The watermark analyzing sub-module 404c may be configured to identify the devices 204 associated with the decoded device IDs. The identified devices 204 may be of interest to the user for performing the action. The identified devices 204 may be present in the same position/room of the user or present in proximity to the position/room of the user. Based on receiving the decoded device IDs, the watermark analyzing sub-module 404c accesses the device type watermark mappings from the device type watermark creator database 318 and identifies the devices 204 associated with the decoded device IDs. The watermark analyzing sub-module 404c provides the information about the identified devices to the action plan manager 406.

The action plan manager 406 may be configured to generate output plans for the action that is of interest to the user or the action initiated by the user. In an embodiment, the output plan may include recommending the identified devices 204 to the user for performing the action, if the action includes performing one of, for example but not limited to, the audio casting, the video casting, the media capture, and the like. The action plan manager 406 may enable the outputter 310 to recommend the identified devices 204 as the output to the user. In an example, the user located in a living room launches a casting application on the user device 206 for audio casting. In such a scenario, the action plan manager 406 may recommend the devices 204 identified by the watermark analyzing module 404c to the user for performing the audio casting. The recommend devices 204 (such as, but is not limited to, a television, a voice assistant, or the like) may present in the living room and may have the functional capability to be used to perform the audio casting.

In an embodiment, the output plan may include enabling any of the identified devices 204 to continue the action that is of interest to the user, if the action includes continuing the action that is being currently performed on another device. The action plan manager 406 may select one of the identified devices 204 to continue the action. In an example, the user starts moving towards a bedroom from a living room, in which the user was watching a movie. In such a scenario, the action plan manager 406 may select one of the devices 204 (identified by the watermark analyzing sub-module 404c) for example, such as, but is not limited to, a television, a family hub, or the like, that are present in the bedroom and have the functional capability to be used to play the movie. The action plan manager 406 enables the selected device 204 such as the television, the family hub, or the like to play the movie that is currently playing on a television located in the living room.

In another embodiment, the action plan may include onboarding the device 204 by assigning the location/position information for the device 204, if the action includes onboarding the device 204. Based on the location/position information of the determined devices 204, the action plan manager 406 may determine the location/position information for the device 204 that needs to be onboarded and assign the location/position/room for the corresponding device 204. The action plan manager 406 onboards/registers the device 204 with the IoT cloud server 202 by communicating the device information and the location/position information of the device 204 to the IoT cloud server 202. In an example, the user launches an onboarding application on the user device 206 to onboard a vacuum cleaner with the IoT cloud server 202. In such a scenario, the action plan manager 406 may assign the position/room for example, a kitchen, to the vacuum cleaner and onboards/registers the vacuum cleaner with the IoT cloud server 202 by communicating the location/position information and the device information of the vacuum cleaner to the IoT cloud server 202.

FIG. 5 is an example diagram depicting the watermark indicating module 302b executable in the user device 206, according to example embodiments.

The watermark indicating module 302b may operate, when the user device 206 receives the device type watermark from another device (another user device 206 or one of the plurality of devices 204) through the IoT cloud server 202, to indicate the received device type watermark. The watermark indicating module 302b may be configured to indicate the device type watermark in the specific time slot. The watermark indicate module 302b may include a watermark and time slot reception sub-module 502, and a watermark exhibiting (or indicating) sub-module 504.

The watermark and time slot reception sub-module 502 may be configured to receive the device type watermark and the associated time slot from the IoT cloud server 202. The device type watermark and the associated time slot may be generated by another device (for example, another user device 206 or one of the plurality of devices 204). The watermark and time slot reception sub-module 502 may enable the inputter 308 to receive/capture the device type watermark and the associated time slot. In an example, the inputter 308 may use the microphone to receive the audio watermark and the camera/photosensor to receive the light watermark. The watermark and time slot reception sub-module 502 may provide the received device type watermark and the associated time slot to the watermark indicating sub-module 504.

The watermark indicating sub-module 504 may be configured to indicate the received device type watermark in the associated time slot. The watermark indicating sub-module 504 may enable the outputter 310 at the received time slot to indicate the device type watermark. In an example, the outputter 310 may use the speaker to indicate the audio watermark and the light emitting device (a bulb, or the like) to indicate the light watermark.

FIGS. 3, 4, and 5 show example blocks of the user device 206, but it is to be understood that other embodiments are not limited thereon. In other embodiments, the user device 206 may include less or more number of blocks. Further, the labels or names of the blocks are used only for illustrative purpose and does not limit the scope of the embodiments herein. One or more blocks may be combined together to perform same or substantially similar function in the user device 206. The device 204 and the server 210 may include components similar to those of the user device 206 as described in FIGS. 3, 4, and 5.

Figure 6A:
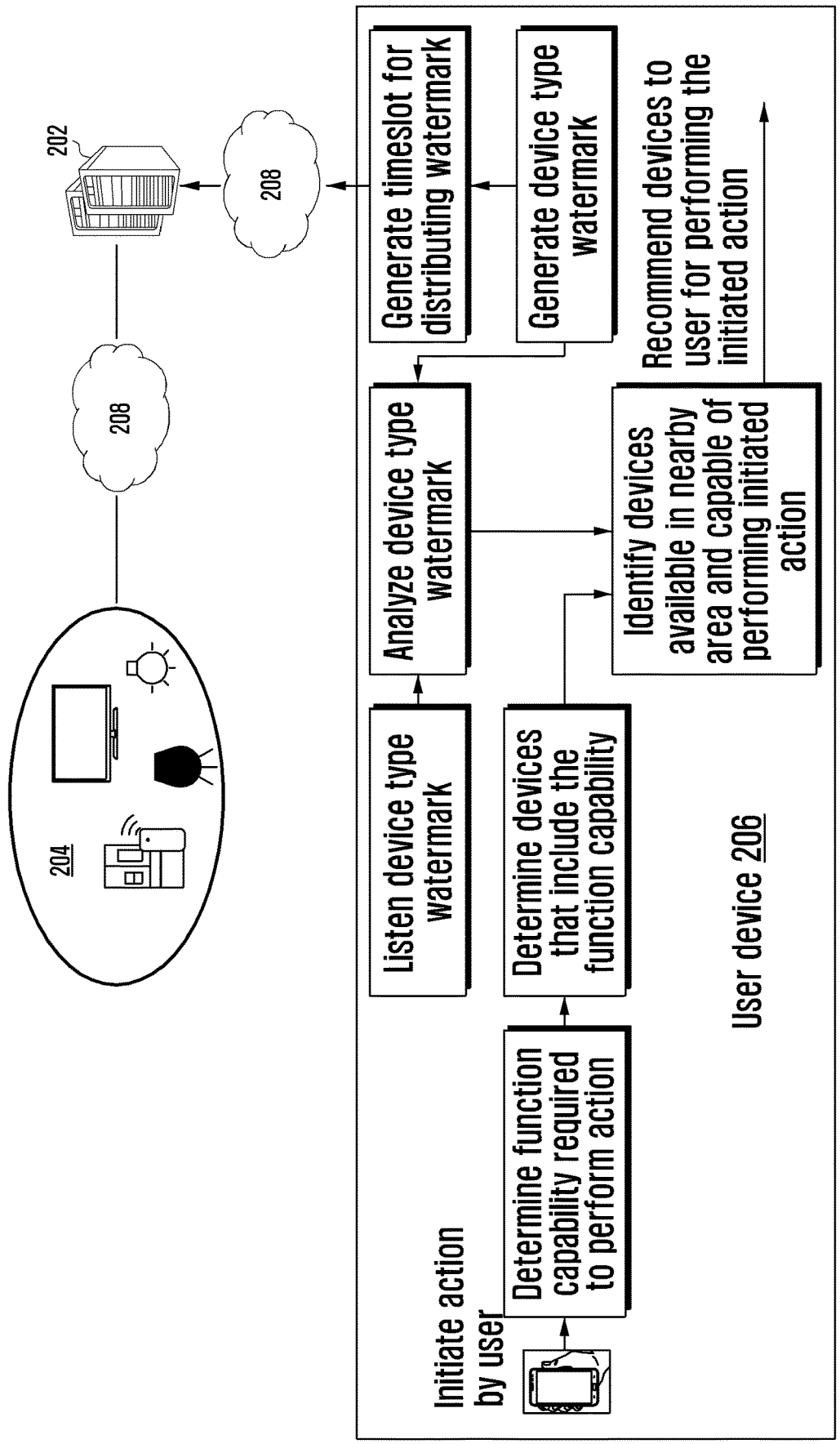
FIGS. 6A, 6B, and 6C are example conceptual diagrams respectively depicting recommendation of devices, onboarding of device, and continuing an action on a device, according to example embodiments.
Figure 6B:
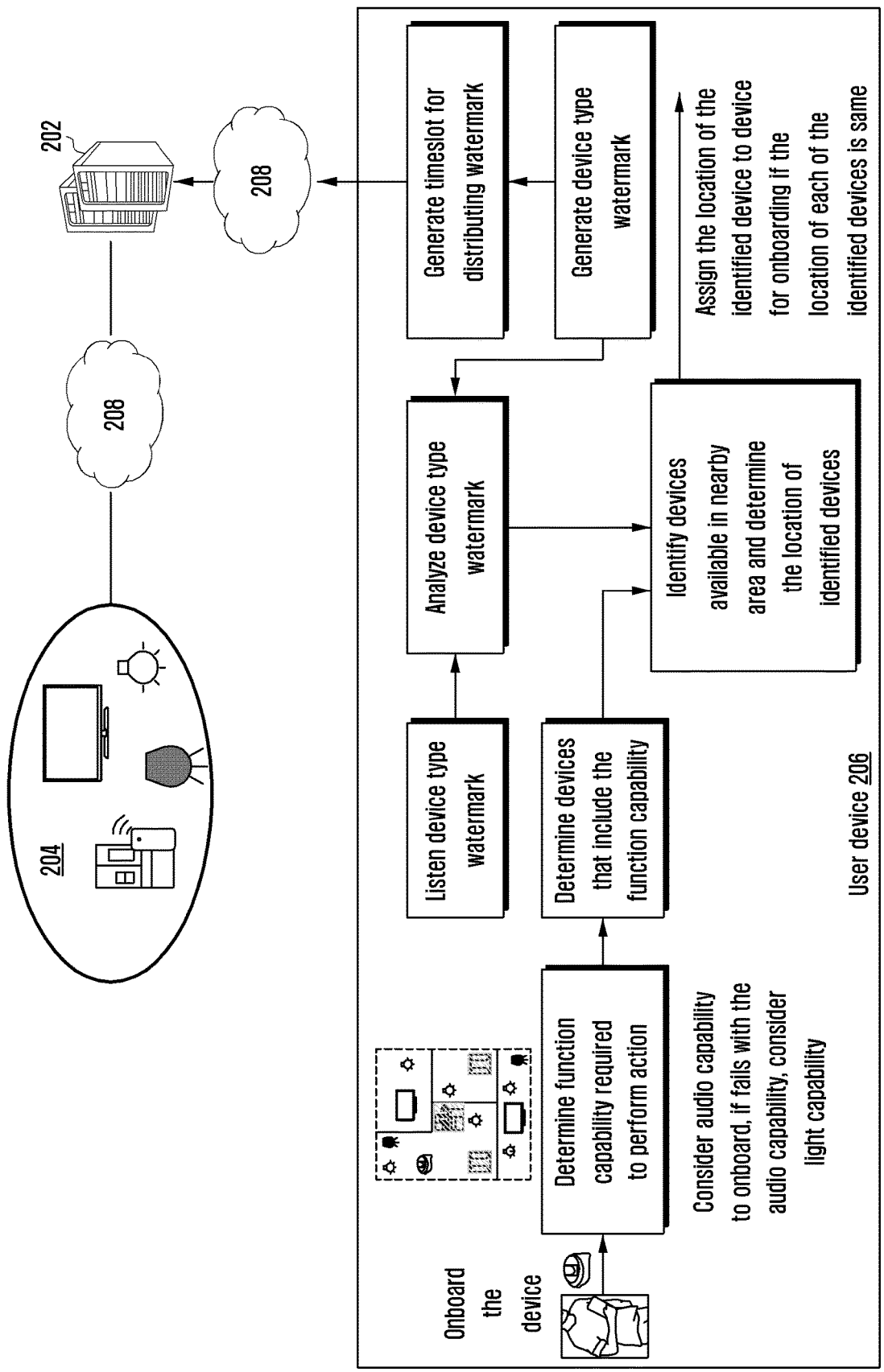
Figure 6C:
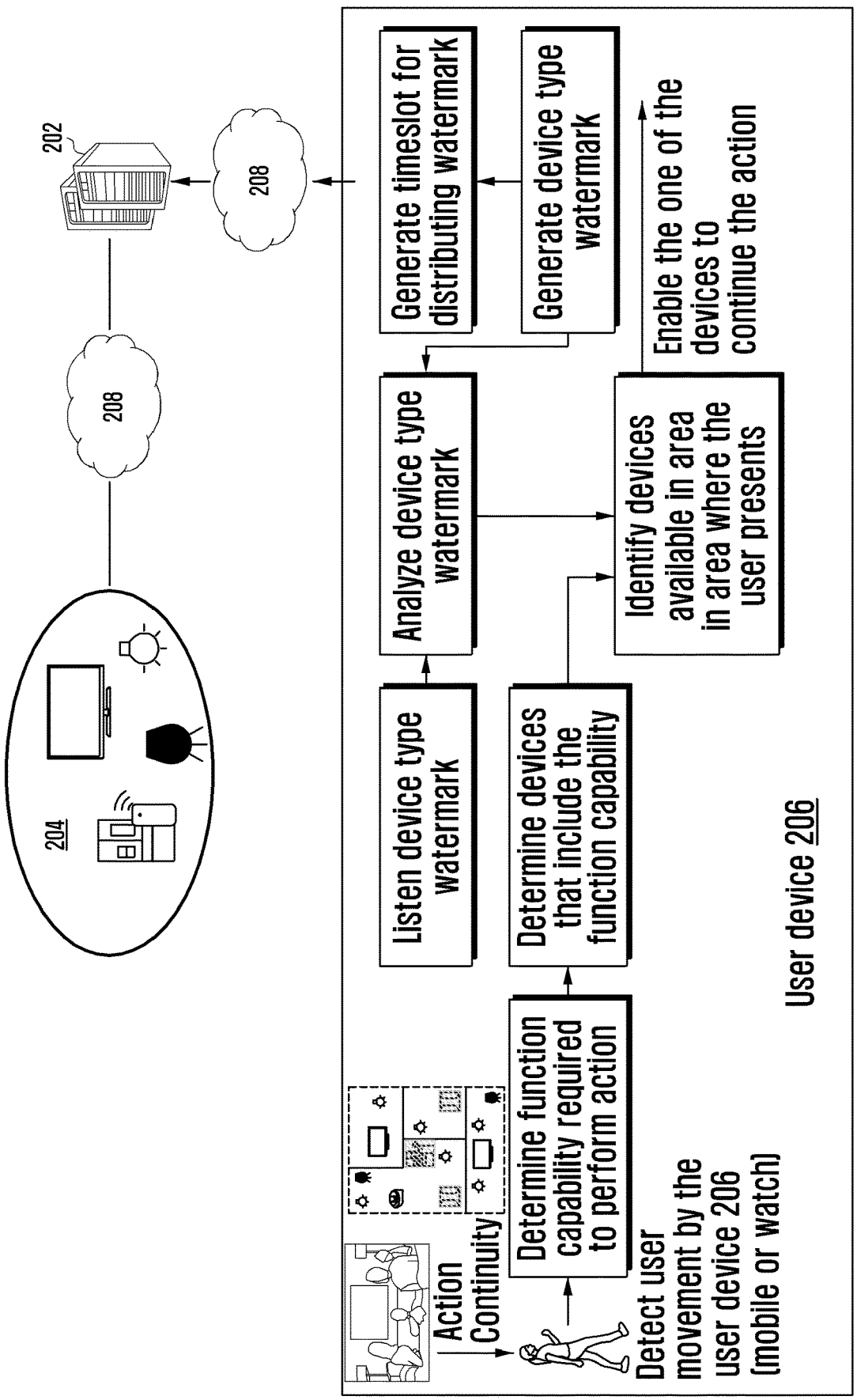

FIGS. 6A, 6B, and 6C are example conceptual diagrams respectively depicting recommendation of the devices 204, onboarding of the device, and continuing the action on the device 204, according to example embodiments.

The user device 206 may capture/receive the input of the user for performing the action. The user device 206 may include the inputter 308 to receive the input. In an example as depicted in FIG. 6A, the input may launch a casting application on the user device 206 for audio casting, video casting, or the like, launch a camera application on the user device 206 for capturing the media, and the like. In another example as depicted in FIG. 6B, the input may be launching an onboarding/registering application for onboarding the device 204. In another example, as depicted in FIG. 6C, the input may be a change in the user behaviour/user movement with respect to the action currently being performed on the one of the plurality of devices 206.

Based on capturing/receiving the input, the user device 206 enables the processor 314 to execute the device identification module 302a to determine the action plan for the received input. The device identification module 302a may include the device type watermark distributor 402, the device type watermark listener 404, and the action plan manager 406.

The user device 206 detects the action initiated by the user, based on the input received from the user. In an example, as depicted in FIG. 6A, the action may include the audio casting, the video casting, the media capture, and the like. In an example, as depicted in FIG. 6B, the action may include onboarding the device. In an example, as depicted in FIG. 6C, the action may also include continuing of the current action that is being left off by the user on the one of the plurality of devices 204.

The user device 206 determines the functional capability to be used to perform the action initiated by the user. The functional capability to be used to perform the action may include one of, audio, video, brightness/light control, and the like. In case of onboarding of the device 204, as depicted in FIG. 6B, the user device 206 initially determines the audio capability as the functional capability. If the onboarding of the device 204 with respect to the determined audio capability fails, the user device 206 determines the light capability as the functional capability.

The user device 206 determines the devices 204 that may include the functional capability to be used to perform the action. The devices 204 may be present in the various locations/positions/rooms in the network environment. In an example, the devices 204 such as, but not limited to, televisions, family hubs, computers, laptops, wearable devices, portable multimedia players, refrigerators, washing machines, air conditioners, electronic picture frames, camcorders, medical mobile devices, or the like may include the video capability/image capability and/or the audio capability. In another example, the devices 204 such as, but not limited to, voice assistant devices, doors, vacuum cleaners, speakers, home theaters, MP3 players, or the like may include the audio capability. In another example, the devices 204 such as, but not limited to, the lights, the cameras, or the like may include the light capability. In another example, the devices 204 such as sensors (for example, temperature sensors, thermostat, and the like), or the like may connect and operate in combination with any other devices that include the audio and/or video capability.

The user device 206 generates the device type watermarks for all the determined devices 204 that include the functional capability to perform the action initiated by the user or of interest to the user. The user device 206 generates the device type watermarks (for example, the audio watermark, the light watermark, or the like) for the devices 204 based on the functional capability of the devices 204. The user device 206 generates the time slots for the devices 204 to indicate the generated device type watermarks.

The user device 206 sends the device type watermarks and the associated time slots of the devices 204 to the IoT cloud server 202 through the communication network 208. The IoT cloud server 202 communicates the device type watermarks and the associated time slots to the respective devices 204 and requests the devices 204 to indicate the device type watermarks in the time slots associated with the devices 204.

The user device 206 may also receive the device type watermarks indicated by the devices 204 in the various time slots. The user device 206 may or may not receive the device type watermarks from all the devices 204 for which the device type watermarks have been generated. In an example, the user device 206 may receive the device type watermark from the devices 204 that are present in the same position/room of the device or present in the position in proximity to the user device 206. The user device 206 decodes the received device type watermarks into the device IDs using the decoder 312 and determines the devices 204 associated with the decoded device IDs. The user device 206 may access the device type watermark mappings from the device type watermark creator database 318 and identify the devices 204 associated with the decoded device IDs.

In an embodiment, as depicted in FIG. 6A, the user device 206 may recommend the identified devices 204 to the user for performing the initiated action. The recommended devices 204 may be present within the same position/room of the user/user device 206. Thus, the user may be notified of only the devices 204 which may be used to perform the action (for example, the audio casting, the video casting, the media capture, and the like).

In another embodiment, as depicted in FIG. 6B, the user device 206 may determine the position information of the determined devices 204. Based on the position information of the determined devices 204, the processor 314 may assign the position/room for the device 204 that needs to be onboarded. The user device 206 onboards/registers the device 204 with IoT cloud server 202 by communicating the device information and the position information to the IoT cloud server 202.

In another embodiment, as depicted in FIG. 6C, the user device 206 may select one of the determined devices 204 and enable the selected device 204 to continue the action that is being left off by the user on another device 204. The selected device 204 may be determined to be in the same position/room of the user (or the user device 206).

FIG. 7 is a flow diagram depicting a method 700 for identifying the devices 204 that are of interest to the user, in the IoT environment based on the device type watermarks, according to example embodiments.

At operation 702, the method 700 includes detecting, by the user device/first device 206, an initiation of the at least one action. The at least one action includes at least one of, for example but not limited to, an action associated with at least one application on the user device 206, a change in user behavior with respect to an action that is being performed on one of the plurality of devices 204, and registering a device 204 (e.g., a new device) with the IoT cloud server 202 using the user device 206.

At operation 704, the method 700 includes determining, by the user device 206, one or more devices/second devices 204 in the IoT environment that may be capable of performing the at least one action that is initiated by the user device 206. At operation 706, the method 700 includes generating, by the user device 206, at least one device type watermark for each of the one or more devices 204.

At operation 708, the method 700 includes sending, by the user device 206, a request to the IoT cloud server 202, requesting each of the one or more devices 204 to indicate the generated at least one device type watermark in at least one time slot associated with each device 204. At operation 710, the method 700 includes identifying, by the user device 206, the at least one device 204 from the one or more devices 204 for the at least one initiated action, based on receiving (or detecting) the at least one device type watermark indicated by the at least one device 204. Various operations in the method 700 may be performed in the order presented, in a different order or simultaneously. Further, in some embodiments, some operations described in FIG. 7 may be omitted.

Figure 8:
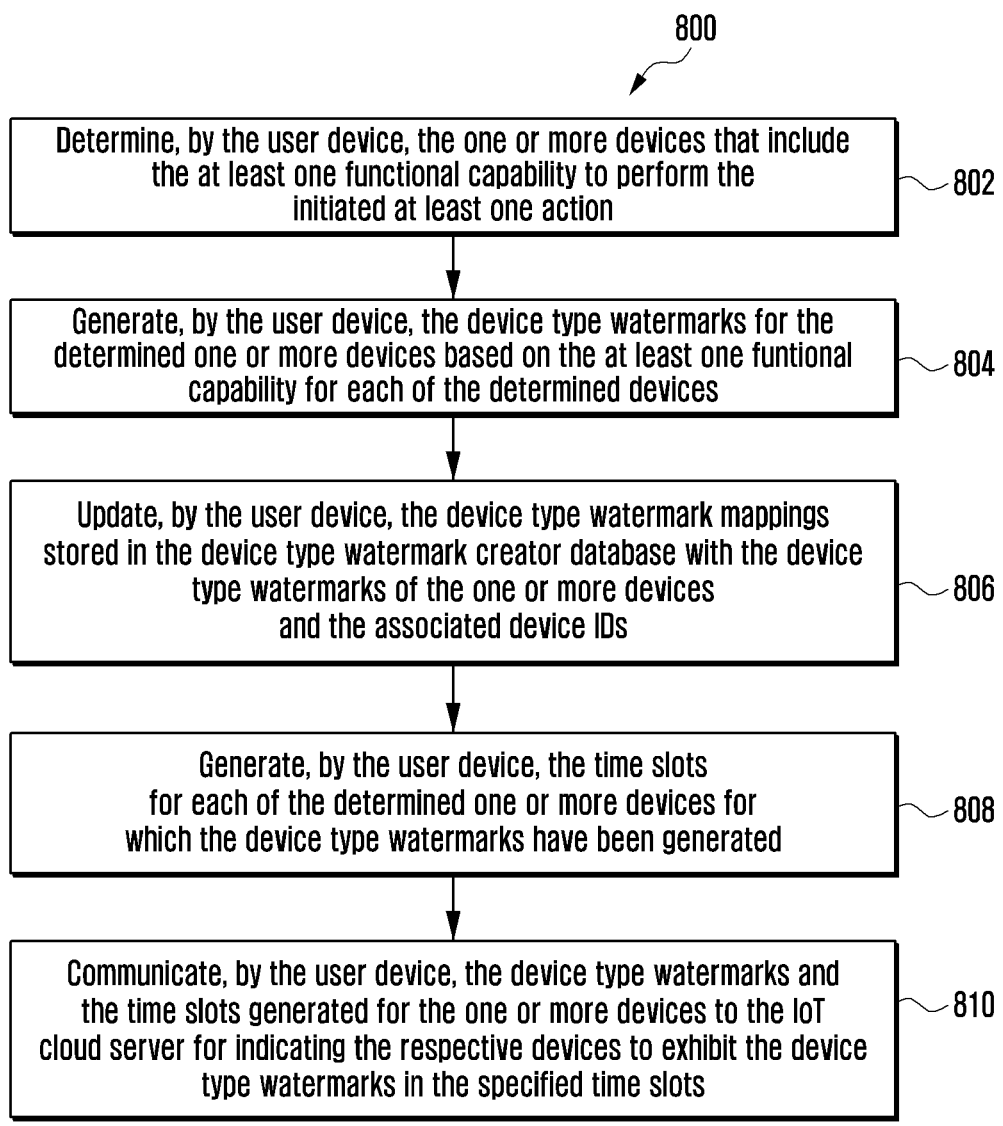
FIG. 8 is a flow diagram depicting a method for distributing device type watermarks to devices, according to example embodiments.

FIG. 8 is a flow diagram depicting a method 800 for distributing the device type watermarks to the devices 204, according to example embodiments.

At operation 802, the method 800 includes, determining, by the user device 206, the one or more devices 204 that include the at least one functional capability to perform the initiated at least one action.

At operation 804, the method 800 includes, generating, by the user device 206, the device type watermarks for the determined one or more devices 204 based on the at least one functional capability for each of the determined devices 204. The device type watermarks may include the audio watermark, the light watermark, or a combination thereof.

At operation 806, the method 800 includes, updating, by the user device 206, the device type watermark mappings stored in the device type watermark creator database 318 with the mappings of the devices 204 with the associated device IDs and the generated device type watermarks for the devices 204. The user device 206 may receive the device IDs of the one or more devices 204 from the IoT cloud server 202.

At operation 808, the method 800 includes generating, by the user device 206, the time slots for each of the determined one or more devices 204 for which the device type watermarks have been generated. The time slot generated for the device 204 may indicate the duration and/or time for the device 204 to indicate the generated device type watermarks.

At operation 810, the method 800 includes, communicating, by the user device 206, the device type watermarks and the time slots generated for the one or more devices 204 to the IoT cloud server 202 for indicating the respective devices 204 to indicate the device type watermarks in the specified time slots. Various operations in the method 800 may be performed in the order presented, in a different order or simultaneously. Further, in some embodiments, some operations described in FIG. 8 may be omitted.

Figure 9:
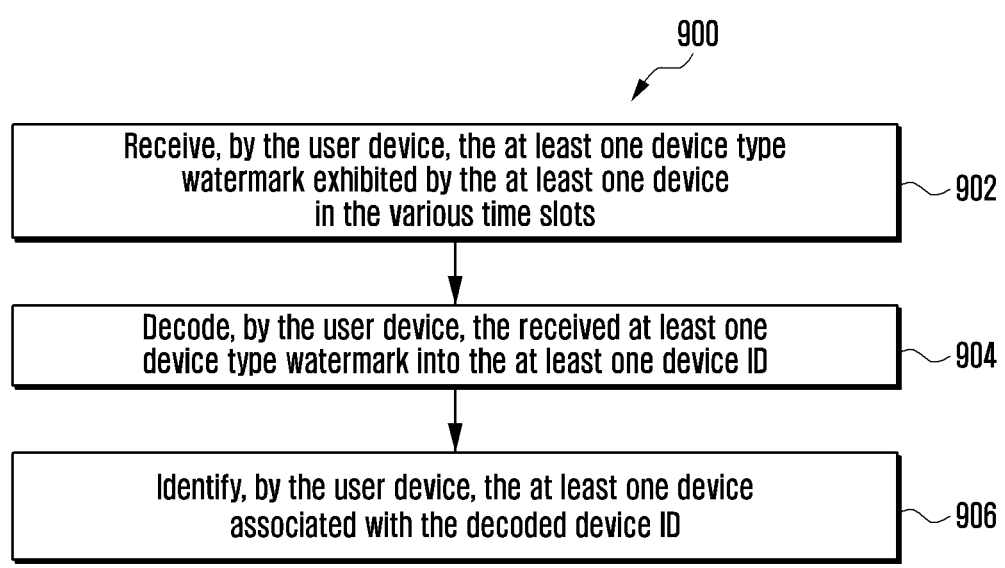
FIG. 9 is a flow diagram depicting a method for analyzing device type watermarks indicated by the devices, according to example embodiments.

FIG. 9 is a flow diagram depicting a method 900 for analyzing the device type watermarks indicated by the devices 204 to identify the device(s) of interest to the user, according to example embodiments.

At operation 902, the method 900 includes, receiving, by the user device 206, the at least one device type watermark indicated by the at least one device 204 in the various time slots. The at least one device 204 may belong to the one or more devices 204 for which the device type watermarks have been generated and communicated.

At operation 904, the method 900 includes, decoding, by the user device 206, the received at least one device type watermark into the at least one device ID. At operation 906, the method includes, identifying, by the user device 206, the at least one device 204 associated with the decoded device ID. The user device 206 may access the device type watermark mappings from the device type watermark creator database 318 and identifies the at least one device 204 associated with the at least one device ID using the accessed device type watermark creator database 318. Various operations in the method 900 may be performed in the order presented, in a different order or simultaneously. Further, in some embodiments, some operations described in FIG. 9 may be omitted.

Figure 10B:
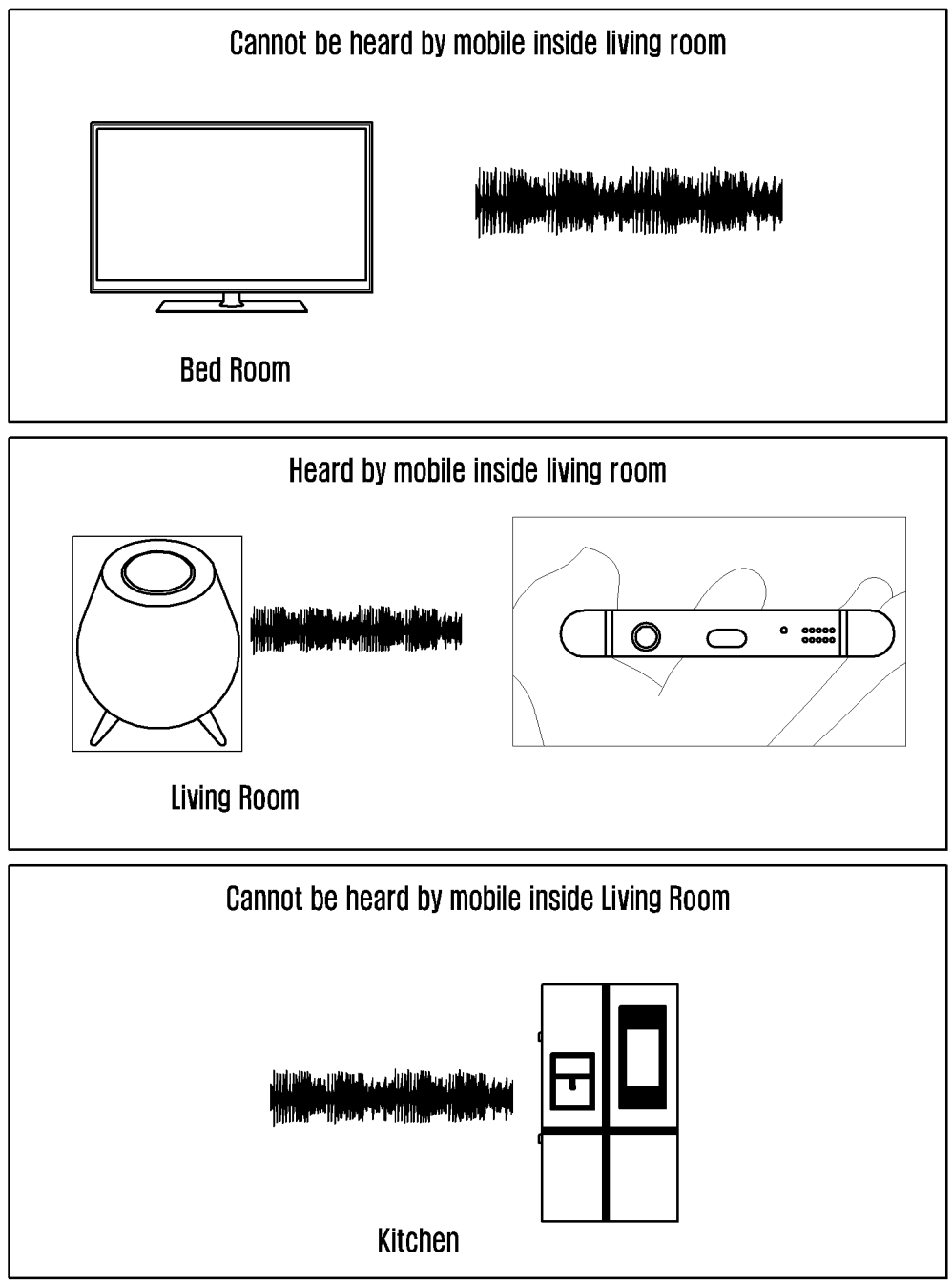

FIGS. 10A and 10B are example diagrams depicting the audio watermark, according to example embodiments. Embodiments herein enable the user device 206 to generate the device type watermarks for the devices 204 based on the functional capability of each of the device 204. The device type watermarks may include at least one of, the audio watermark, the light watermark, or a combination thereof.

The audio watermark may include a pattern array of ultrasound waves. The ultrasound waves may have frequencies higher than an upper audible limit of human hearing. The ultrasound waves may not be different from a normal (audible) sound in its physical properties, except that humans cannot hear the ultrasound waves. The ultrasound waves included in the audio watermark may include at least one of a message, a text, or the like. The audio watermark may be transmitted using the speaker and received using the microphone. The ultrasound waves included in the audio watermark may have a shorter distance of transmission (for example, 100-200 milliseconds (ms) with a frequency of 30 ms per pattern array). An example audio watermark corresponding to a "hello" message exchanged between two devices is depicted in FIG. 10A.

The audio watermark may not be travelled through the opaque objects (for example, doors, walls, or the like) in the network environment. The audio watermark indicated by the device (204, 206) may be received/accessible by another device (204, 206), which presents in the same position/room of the device. In an example scenario, as depicted in FIG. 10B, a voice assistant device, as an example of the device 204, that is present in a living room in a smart home environment may indicate the audio watermark. In such a scenario, the user device 206 or any of the plurality of devices 206 present in the living room may access/receive the audio watermark indicated by the voice assistant device (present in the living room). As the audio watermark does not travel through the walls/doors, the user device 206 or any of the plurality of devices 204 present in other locations such as a bedroom, a kitchen, a study room, or the like, in the smart home environment may not be able to access/receive the audio watermark indicated by the voice assistant device (present in the living room).

FIGS. 11A and 11B are example diagrams depicting the light watermark, according to example embodiments. Embodiments herein enable the user device 206 to generate the device type watermarks for the devices 204 based on the functional capability of each of the device 204. The device type watermarks may include at least one of the audio watermark, the light watermark, or a combination thereof.

The light watermark may include a pattern array based on properties of the light such as, but not limited to, brightness, color, ON/OFF switching, and the like. The light watermark may include, for example, the brightness watermark, the color watermark (based on Red Green Blue (RGB)), the ON-OFF watermark, or the like, as depicted in FIG. 11A. The light watermark may be indicated using the light emitting device (for example; a bulb, or the like) and received/accessed using the camera/photosensor.

The light watermark may not be travelled through the opaque objects (for example, doors, walls, or the like) in the network environment. The light watermark indicated by the device (204, 206) may be received/accessible by another device (204, 206), which presents in the same position/room of the device. In an example scenario, as depicted in FIG. 11B, a lighting device, as an example of the device 204, that is present in a living room in a smart home environment indicates the light watermark. In such a scenario, the user device 206 or any of the plurality of devices 204 present in the living room may access/receive the light watermark indicated by the lighting device (that is present in the living room). As the light watermark does not travel through the walls/doors, the user device 206 or any of the plurality of devices 204 present in other locations such as a bedroom, a kitchen, or the like, in the smart home environment may not be able to access/receive the light watermark indicated by the lighting device (that is present in the living room).

Figure 12A:
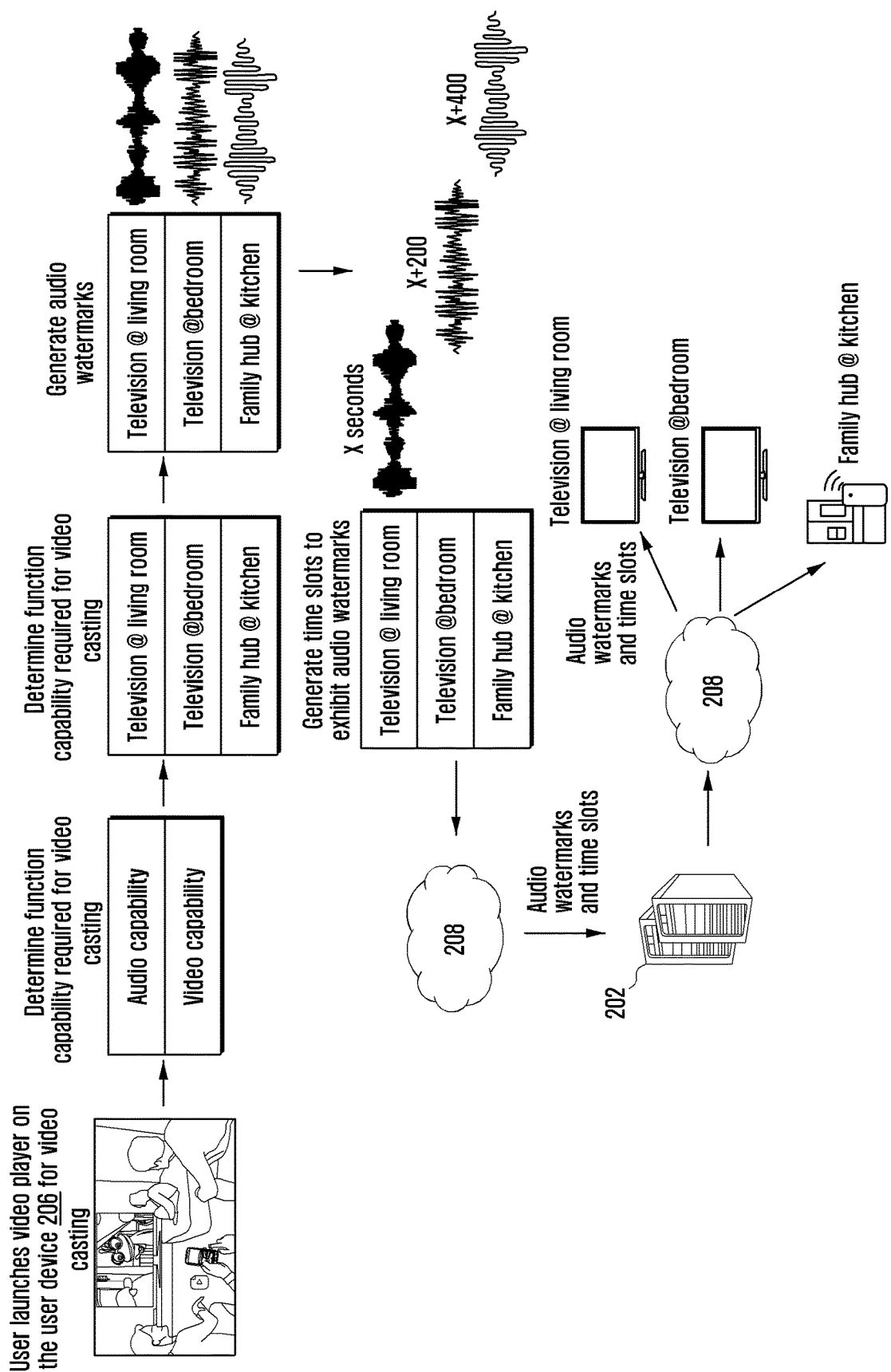
FIGS. 12A and 12B are example diagrams depicting identification of devices for video casting, according to example embodiments.
Figure 12B:
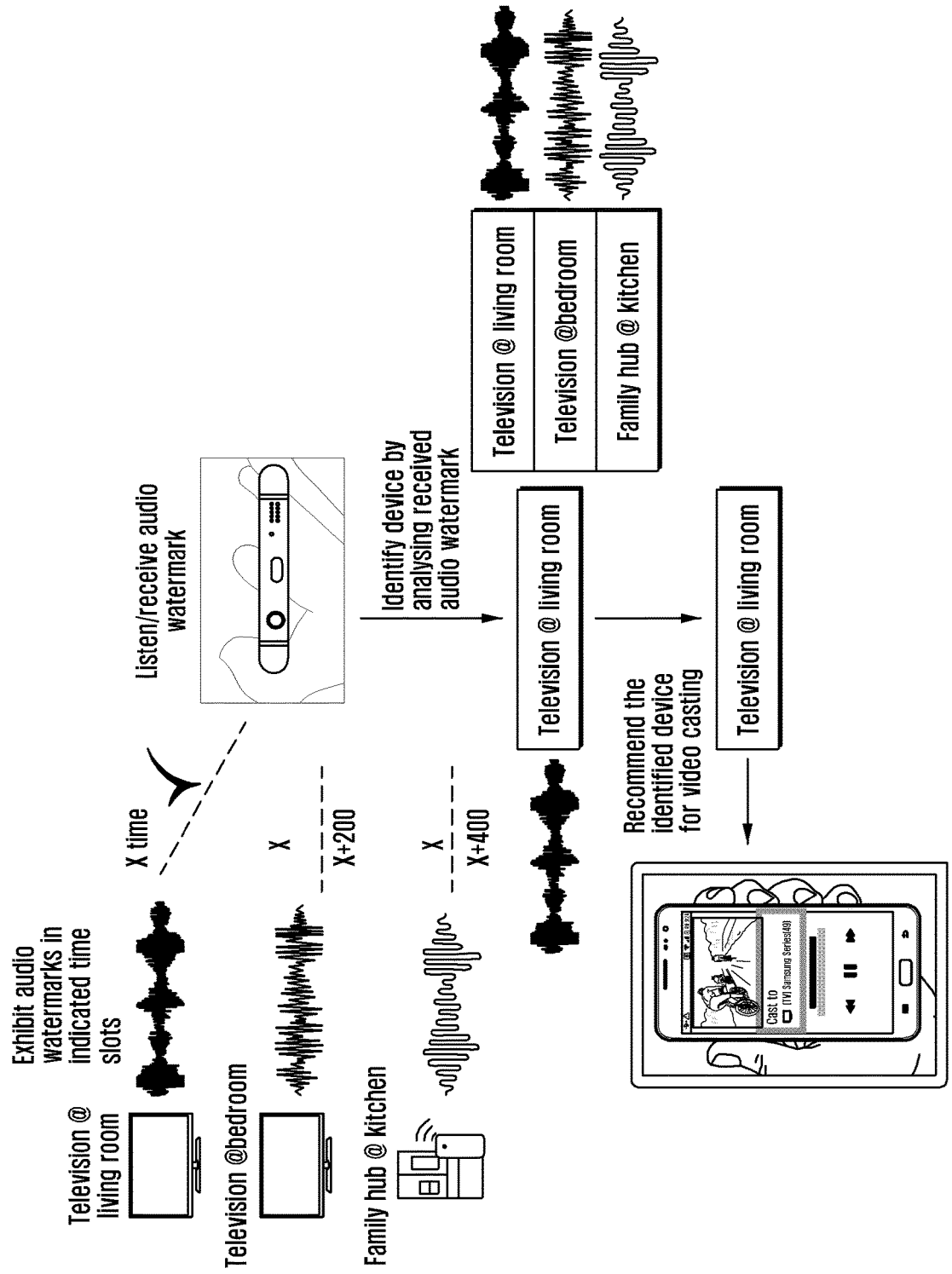

FIGS. 12A and 12B are example diagrams depicting identification of the devices 204 for video casting, according to example embodiments.

In an example smart home network scenario, as depicted in FIG. 12A, the user launches/opens a video player application on the user device 206 for video casting. The user may be interested in the device(s) 204 that is present in the living room for the video casting. In such a scenario, the user device 206 may determine and recommend the device(s) 204 that are present in the living room to the user for the video casting.

For determining and recommending the device(s) 204, the user device 206 determines that the audio capability and the video capability are the functional capabilities to be used for the video casting. The user device 206 determines the devices 204 from the plurality of devices 204 present in the smart home network, that may include the audio capability and video capability. In an example, the devices 204 such as, a television present in a living room, a television present in a bedroom, and a family hub present in a kitchen may include the audio capability and the video capability. The user device 206 generates the audio watermarks, as an example of the device type watermarks, for the television present in the living room, the television present in the bedroom, and the family hub present in the kitchen. The user device 206 stores the mapping of the devices 204 (e.g., the device type watermarks of the television present in the living room, the television present in the bedroom, and the family hub present in the kitchen) with the associated device IDs and the audio watermarks in the device type watermark creator database 318. The user device 206 generates a time slot for the television present in the living room (for example, X ms from a time point Y), a time slot for the television present in the bedroom (for example, 200 ms after a time point Y+X ms), and a time slot for the family hub present in the kitchen (for example, 400 ms after a time point Y+X ms). The user device 206 requests the IoT cloud server 202 to send the respective audio watermarks and the associated time slots to the television in the living room, the television in the bedroom, and the family hub in the kitchen.

As depicted in FIG. 12B, the television present in the living room, the television present in the bedroom, and the family hub present in the kitchen indicate the received respective audio watermarks in the respective corresponding time slots. In this example scenario, the user device 206 may receive the audio watermark only from the television present in the living room. The user device 206 analyzes the received audio watermark and converts/decodes the received audio watermark into the device ID. The user device 206 accesses the mapping of the devices 204 (e.g., the device type watermarks of the television present in the living room, the television present in the bedroom, and the family hub present in the kitchen) with the associated device IDs and the audio watermarks from the watermark creator database 318 and determines the device associated with the decoded device IDs. The determined device associated with the decoded device ID may be the television present in the living room. The user device 206 recommends the television present in the living room to the user for the video casting. Thus, the user may receive information about the device(s) 204 that is of interest, for the video casting.

Figure 13A:
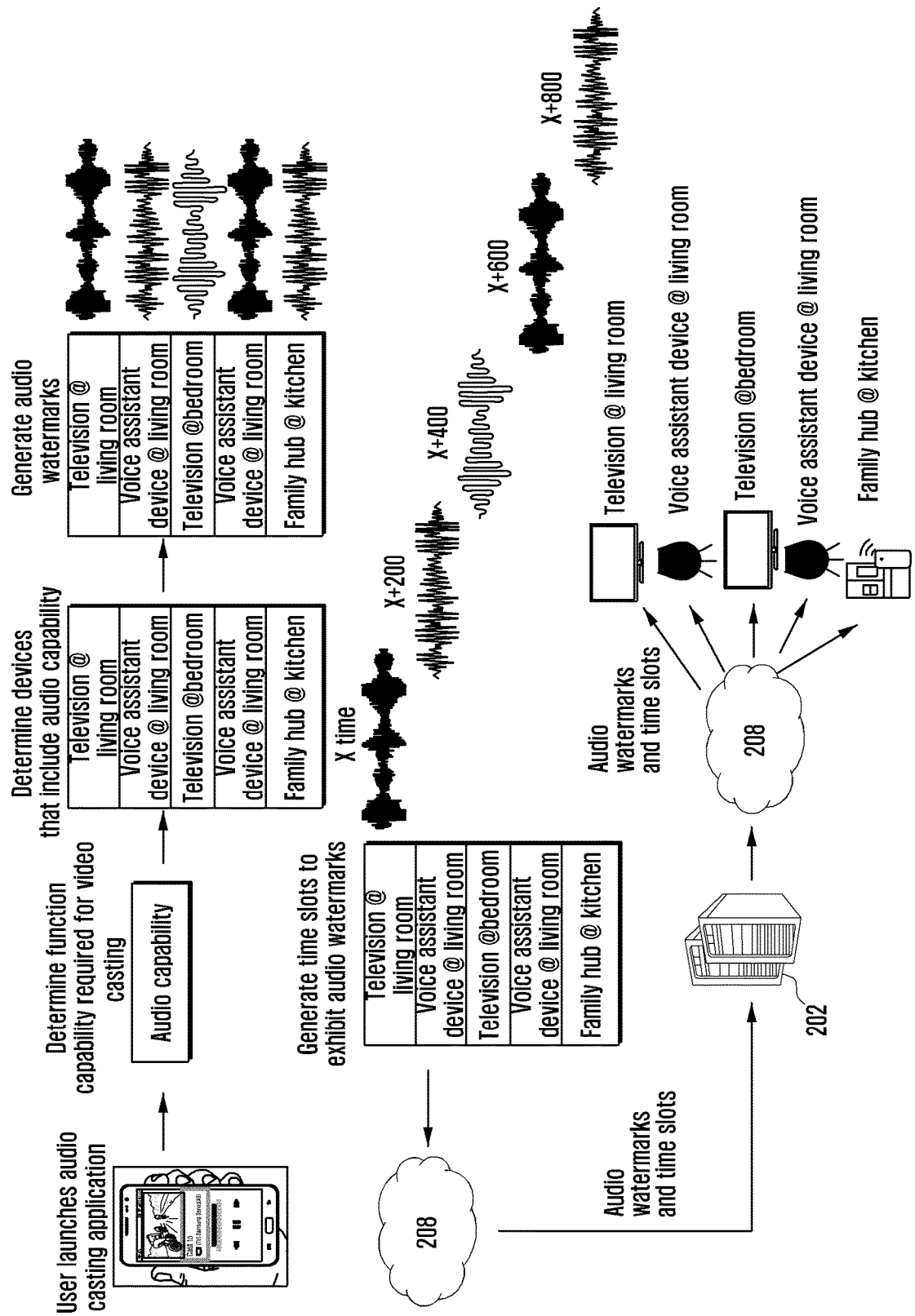
FIGS. 13A and 13B are example diagrams depicting identification of devices for audio casting, according to example embodiments.
Figure 13B:
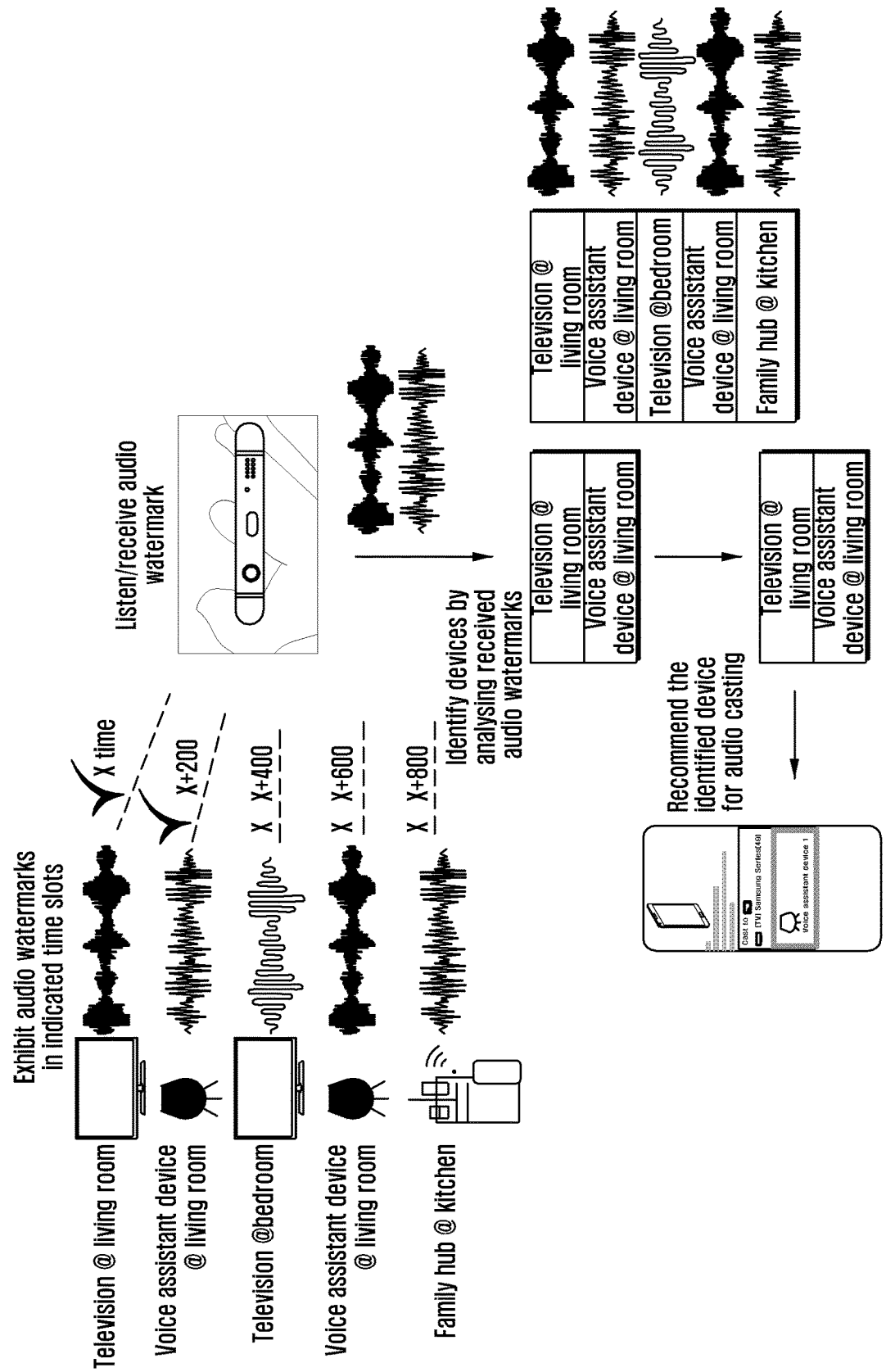

FIGS. 13A and 13B are example diagrams depicting identification of the devices 204 for audio casting, according to example embodiments.

In an example smart home network scenario, as depicted in FIG. 13A, the user present in the living room launches/opens a casting application on the user device 206 to play audio in the user device 206 on another device 204 (i.e., for audio casting). The user may be interested in the device(s) 204 that is present in the living room for the audio casting. In such a scenario, the user device 206 may determine and recommend the device(s) 204 that is present in the living room to the user for the audio casting.

For determining and recommending the device(s) 204, the user device 206 determines the audio capability as the functional capability to be used for the audio casting. The user device 206 determines the devices 204 from the plurality of devices 204 present in the smart home network, that may include the audio capability. In an example, the devices 204 such as, a television present in a living room, a voice assistant device present in a living room, a television present in a bedroom, a voice assistant device present in a bedroom, and a family hub present in a kitchen, may include the audio capability. The user device 206 generates the audio watermarks for the television present in the living room, the voice assistant device present in the living room, the television present in the bedroom, the voice assistant device present in the bedroom, and the family hub present in the kitchen. The user device 206 stores the mapping of the devices 204 (e.g., the device type watermarks of the television present in the living room, the television present in the bedroom, the voice assistant device present in the living room, the voice assistant device present in the bedroom, and the family hub present in the kitchen) with the associated device IDs and the audio watermarks in the device type watermark creator database 318. The user device 206 generates the time slots for the audio watermarks generated for the television present in the living room, the voice assistant device present in the living room, the television present in the bedroom, the voice assistant device present in the bedroom, and the family hub present in the kitchen. The time slot for the device may indicate the duration and the time to indicate the audio watermark. The user device 206 requests the IoT cloud server 202 to send the respective audio watermarks and the associated time slots to the television present in the living room, the voice assistant device present in the living room, the television present in the bedroom, the voice assistant device present in the bedroom, and the family hub present in the kitchen.

As depicted in FIG. 13B, the television present in the living room, the voice assistant device present in the living room, the television present in the bedroom, the voice assistant device present in the bedroom, and the family hub present in the kitchen indicate the received respective audio watermarks in the respective time slots. In this example scenario, the user device 206 may receive the audio watermark from the television present in the living room and the voice assistant device present in the living room, as the audio watermark does not travel through the walls/doors. The user device 206 analyzes the received audio watermarks and converts/decodes the received audio watermarks into the device IDs. The user device 206 accesses the mapping of the devices 204 with the associated device IDs and the audio watermarks in the device type watermark creator database 318 and determines the device associated with the decoded device IDs. The determined devices associated with the decoded device IDs may be the television present in the living room and the voice assistant device present in the living room. The user device 206 recommends the television present in the living room and the voice assistant device present in the living room to the user for the audio casting. Thus, the user may receive information about the devices 204 that is of interest, for the audio casting.

Figure 14A:
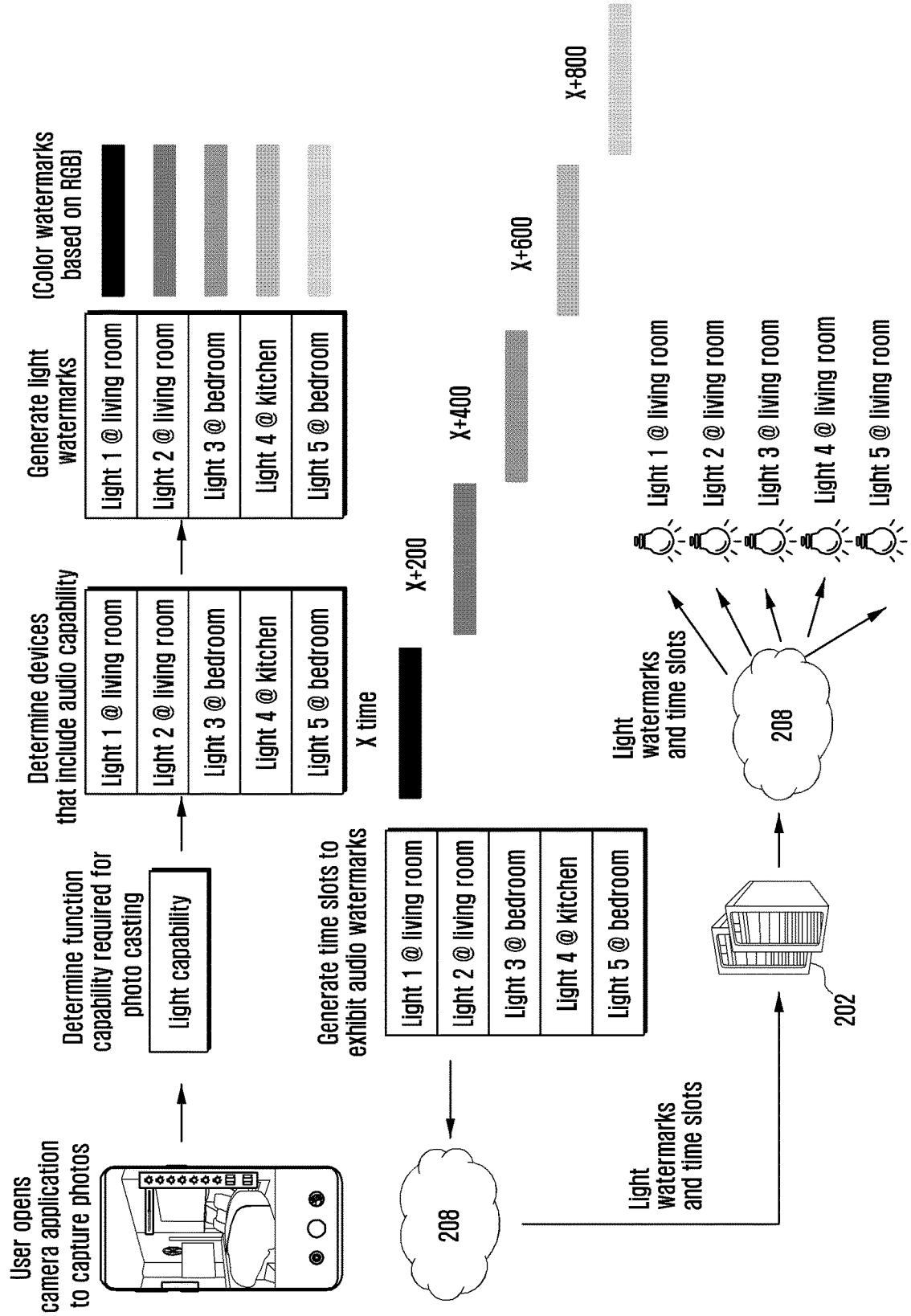
FIGS. 14A and 14B are example diagrams depicting identification of devices for capturing media, according to example embodiments.
Figure 14B:
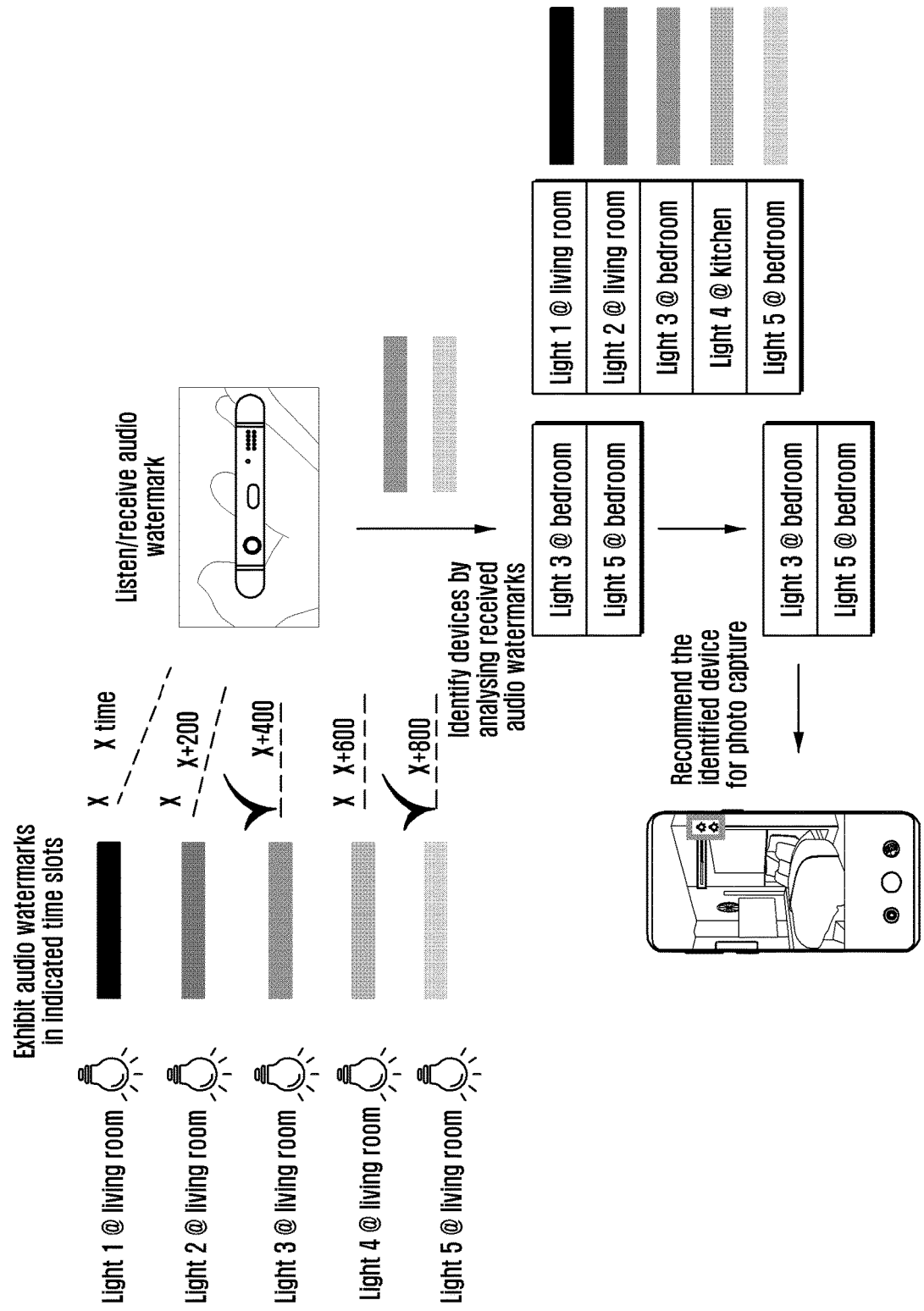

FIGS. 14A and 14B are example diagrams depicting identification of the devices 204 for capturing media, according to example embodiments.

In an example smart home network scenario, as depicted in FIG. 14A, the user present in a bedroom opens a camera application to capture an object (for example, images/photos). The user may be interested in controlling brightness of the lights/devices 204 that is present in the bedroom for capturing the photos. In such a scenario, the user device 206 may determine and recommend the lights that is present in the bedroom to the user for the capturing the photos.

For determining and recommending the lights, the user device 206 determines that the light capability as the functional capability to be used for capturing the photos. The user device 206 determines the devices 204 from the plurality of devices 204 present in the smart home network, that may include the light capability. In an example, the devices 204 such as, a light 1 present in a living room, a light 2 present in the living room, a light 3 present in the bedroom, a light 4 present in a kitchen, and a light 5 present in the bedroom may include the light capability. The user device 206 generates the light watermarks for the lights 1-5. The user device 206 stores the mapping of the devices 204 (e.g., lights 1-5) with the associated device IDs and the light watermarks in the device type watermark creator database 318. The user device 206 generates the time slots for the light watermarks of the lights 1-5. The time slot for the light may indicate the duration and the time to indicate the light watermark. The user device 206 requests the IoT cloud server 202 to send the respective light watermarks and the associated time slots to the lights 1-5.

As depicted in FIG. 14B, the lights 1-5 initiate indicating (e.g., exhibiting) the received respective light watermarks in the respective time slots. In this example scenario, the user device 206 may receive the light watermark from the light 3 and the light 5, because the light watermarks do not travel through the walls/doors. The user device 206 analyzes the received light watermarks and converts/decodes the received light watermarks into the device IDs. The user device 206 accesses the mapping of the lights with the associated device IDs and the audio watermarks in the device type watermark creator database 318 and determines the lights associated with the decoded device IDs. The determined light associated with the decoded device IDs may be the lights 3 and 5, present in the bedroom. The user device 206 recommends the lights 3 and 5 to the user for capturing an image (e.g., photo). Thus, the user may control the brightness of the lights 3 and 5 to capture the photo in the bedroom.

Figure 15A:
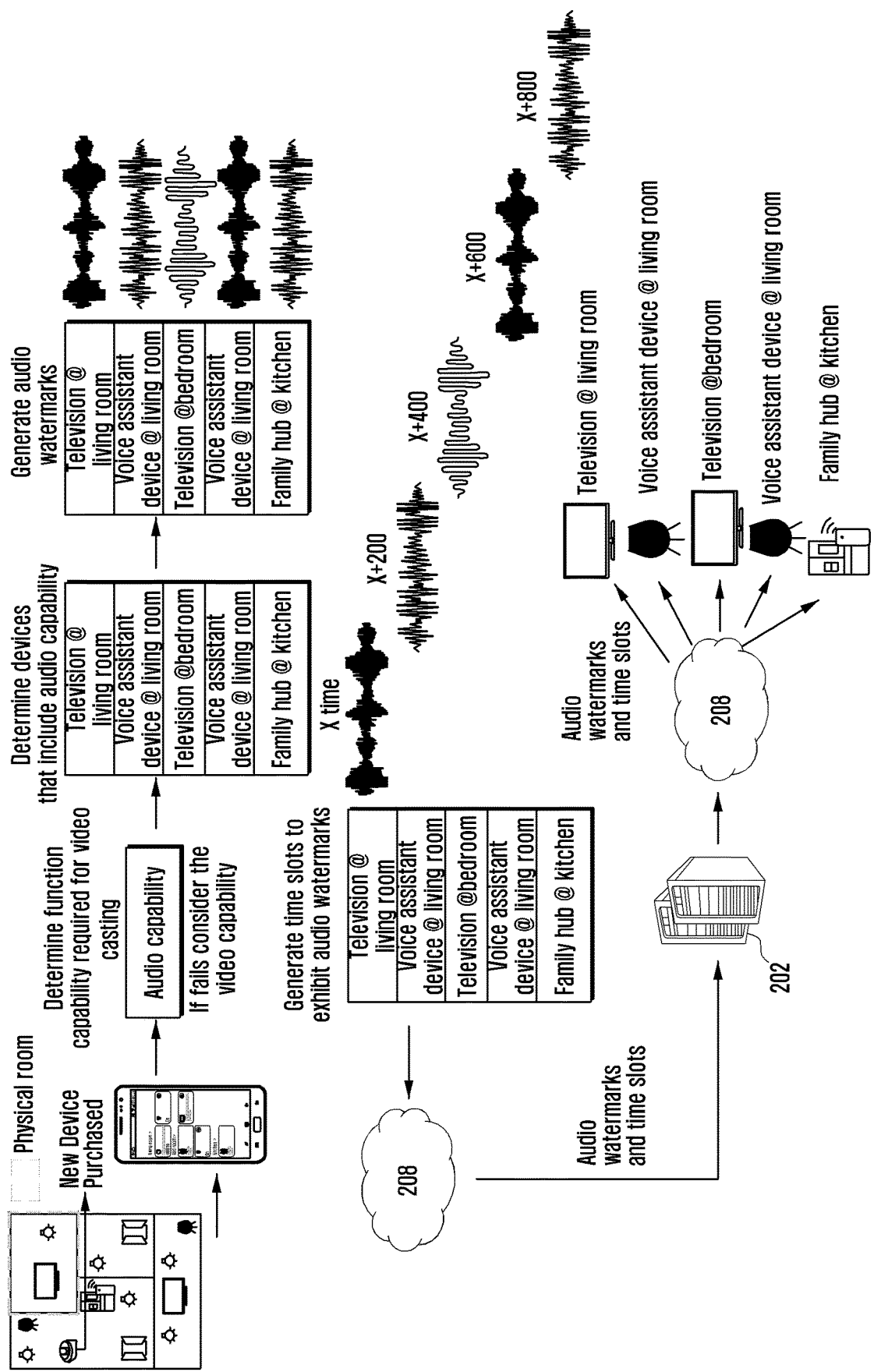
FIGS. 15A and 15B are example diagrams depicting onboarding of a device, according to example embodiments.
Figure 15B:
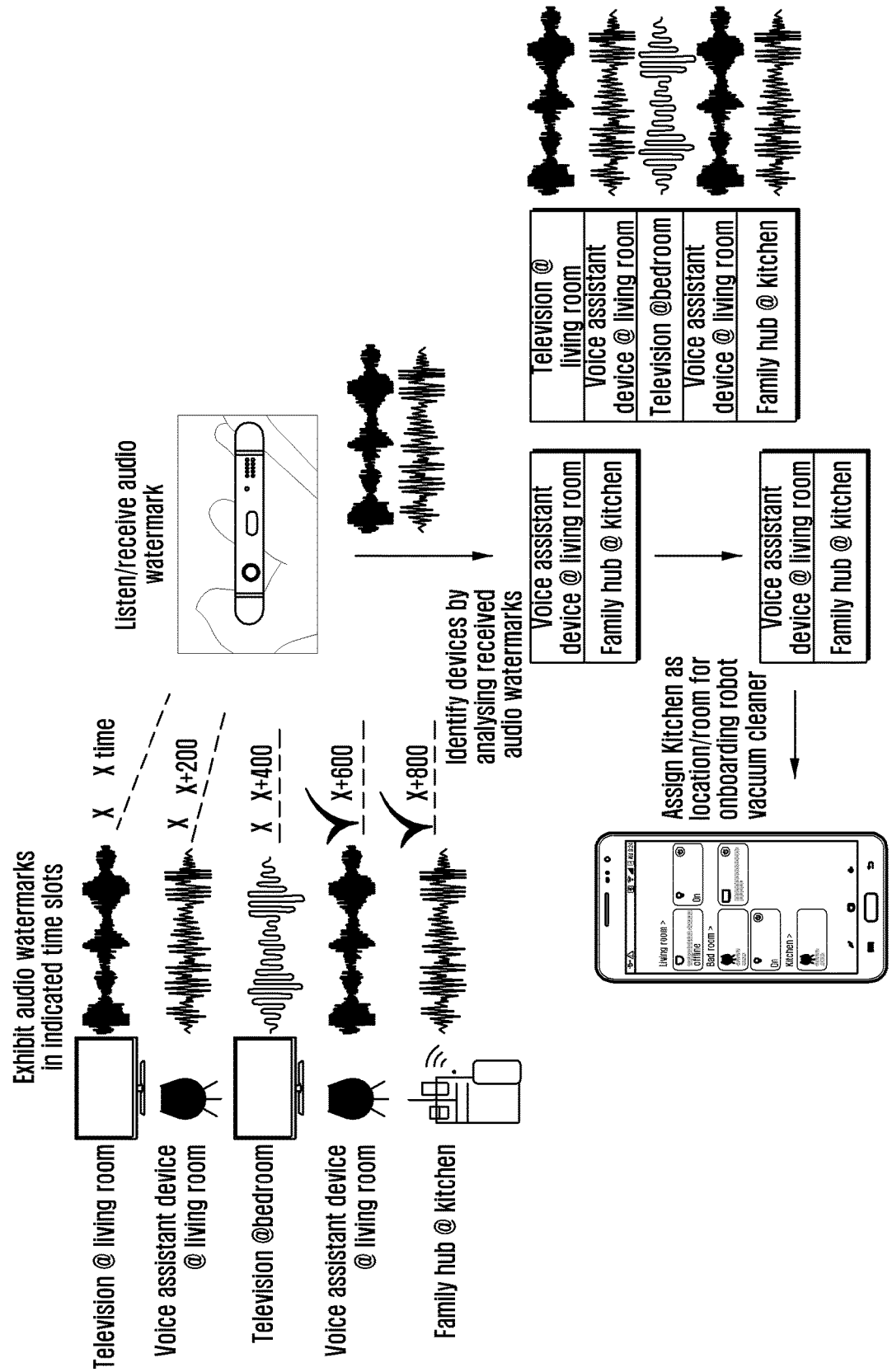

FIGS. 15A and 15B are example diagrams depicting the onboarding of the device 204, according to example embodiments.

In an example smart home network scenario, as depicted in FIG. 15A, the user present in a kitchen opens an onboarding application on the user device 206 to onboard a robot vacuum cleaner. In such a scenario, the user device 206 may determine a position/room for the robot vacuum cleaner and onboard/register the robot vacuum cleaner with the IoT cloud server 202.

For onboarding the robot vacuum cleaner, the user device 206 assigns the highest priority to the audio capability, compared to the other functional capabilities and determine that the audio capability as the functional capability to be used for onboarding the robot vacuum cleaner. The user device 206 determines the devices 204 from the plurality of devices 204 present in the smart home network, that may include the audio capability. In an example, the devices 204 such as, a television present in a living room, a voice assistant device present in a living room, a television present in a bedroom, a voice assistant device present in a kitchen, and a family hub present in a kitchen, may include the audio capability. The user device 206 generates the audio watermarks for the television present in the living room, the voice assistant device present in the living room, the television present in the bedroom, the voice assistant device present in the kitchen, and the family hub present in the kitchen. The user device 206 stores the mapping (or information) of the devices 204 (the television present in the living room, the voice assistant device present in the living room, the television present in the bedroom, the voice assistant device present in the kitchen, and the family hub present in the kitchen) with the associated device IDs and the audio watermarks in the device type watermark creator database 318. The user device 206 generates the time slots for the audio watermarks generated for the television present in the living room, the voice assistant device present in the living room, the television present in the bedroom, the voice assistant device present in the kitchen, and the family hub present in the kitchen. The time slot for the device may indicate the duration and/or the time to indicate the audio watermark. The user device 206 requests the IoT cloud server 202 to send the respective audio watermarks and the associated time slots to the television present in the living room, the voice assistant device present in the living room, the television present in the bedroom, the voice assistant device present in the kitchen, and the family hub present in the kitchen.

As depicted in FIG. 15B, the television present in the living room, the voice assistant device present in the living room, the television present in the bedroom, the voice assistant device present in the kitchen, and the family hub present in the kitchen indicate the received (or detected) respective audio watermarks in the respective time slots. In this example scenario, the user device 206 may receive the audio watermarks from the voice assistant device present in the kitchen and the family hub present in the kitchen. The user device 206 analyzes the received audio watermarks and converts/decodes the received audio watermarks into the device IDs. The user device 206 accesses the mapping of the devices 204 with the associated device IDs and the audio watermarks in the device type watermark creator database 318 and determines the devices associated with the decoded device IDs. The determined devices associated with the decoded device IDs may be the voice assistant device present in the kitchen and the family hub present in the kitchen. The user device 206 determines the kitchen as the location/position for the robot vacuum cleaner, because the kitchen is the place in which the determined devices are present. The user device 206 onboards the robot vacuum cleaner with the IoT cloud server 202 by communicating the device information and the determined location/position information of the robot vacuum cleaner to the IoT cloud server 202.

If the user device 206 fails to determine the position/room for the robot vacuum cleaner (e.g., if the user device 206 determines the devices of different locations/rooms), the user device 206 performs the above operations to onboard the robot vacuum cleaner by determining the light capability as the functional capability to be used for onboarding the robot vacuum cleaner.

Figure 16A:
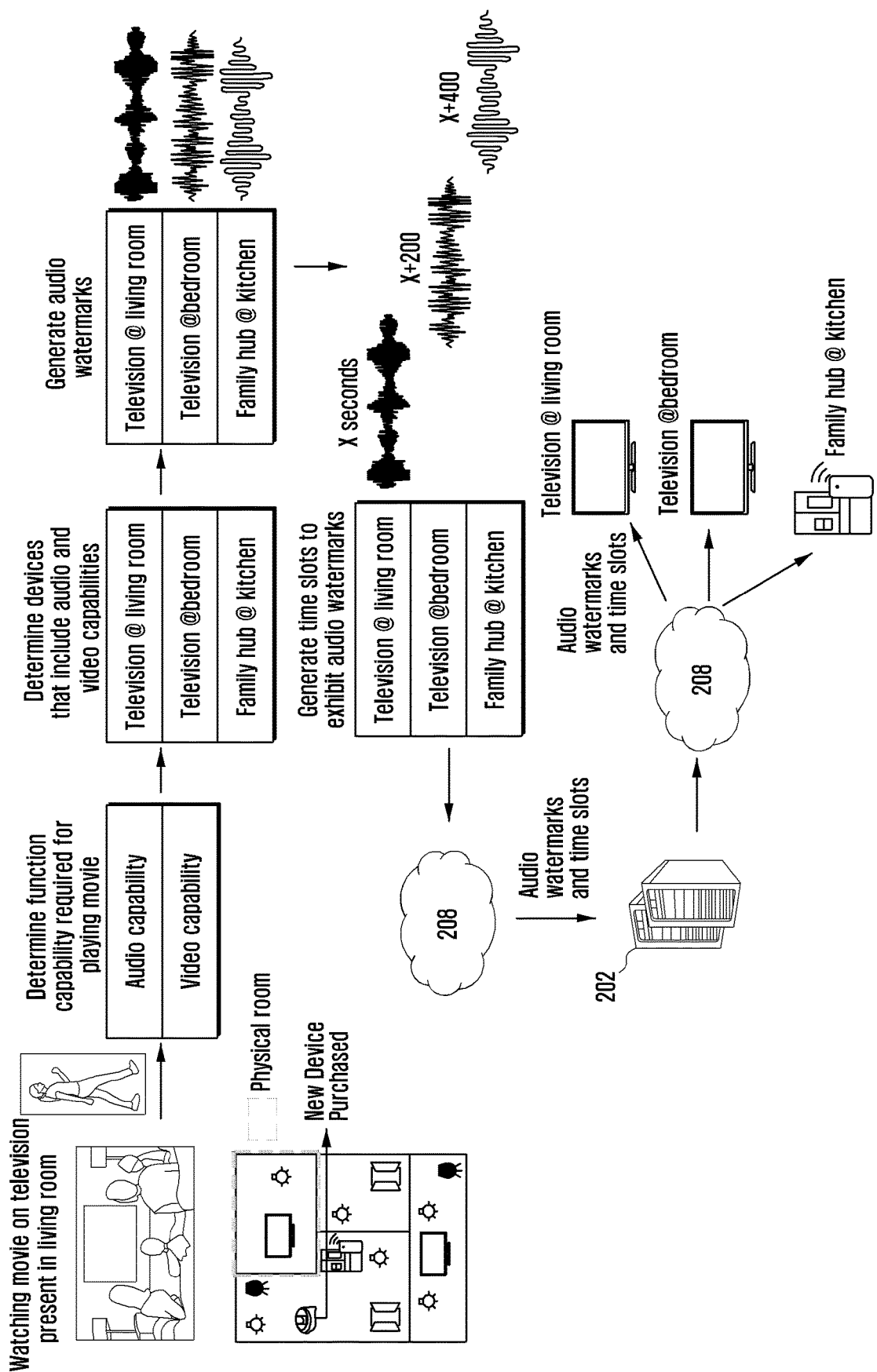
FIGS. 16A and 16B are example diagrams depicting continuation of an action on any of devices included in a network environment, according to example embodiments.
Figure 16B:
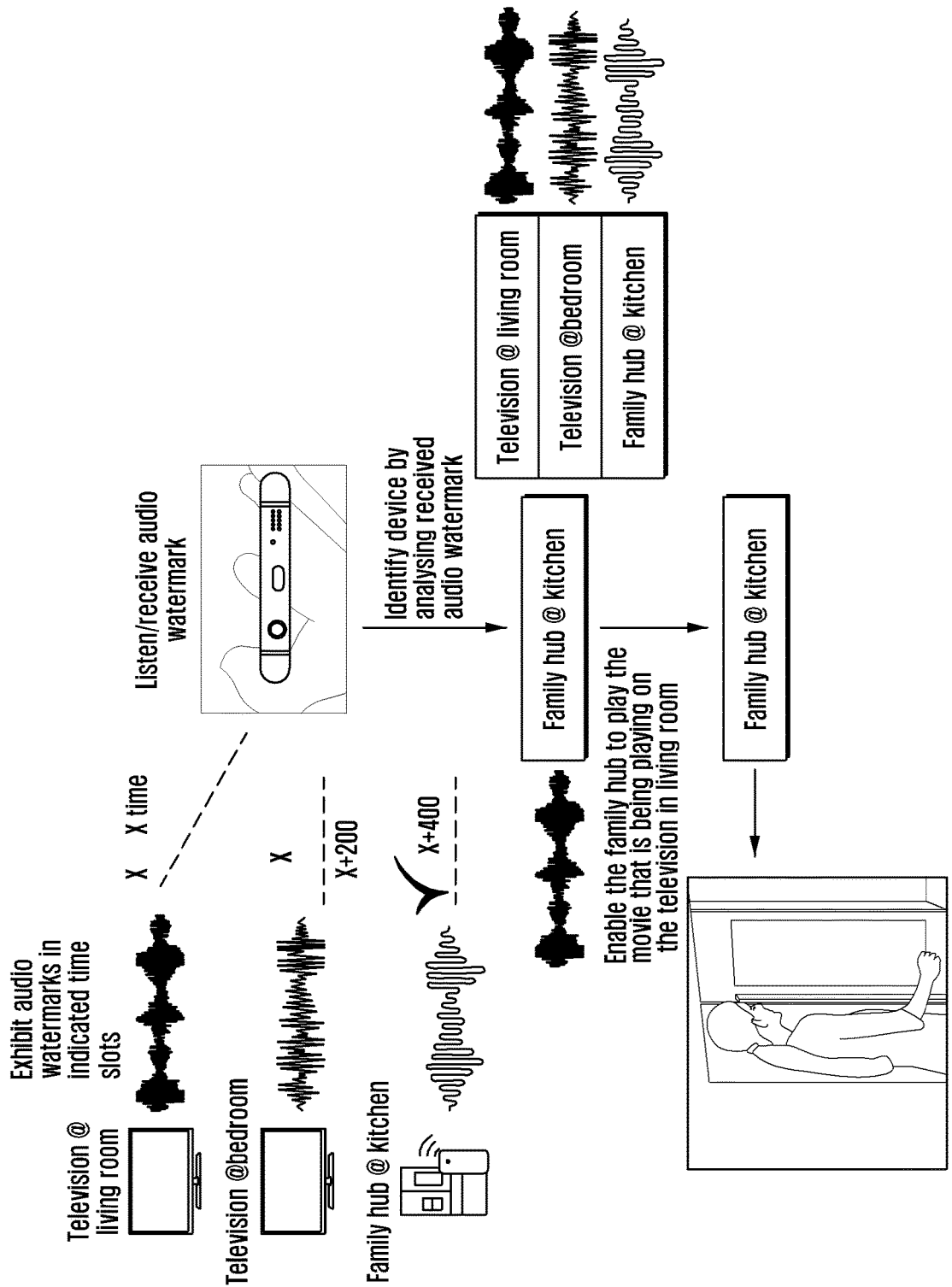

FIGS. 16A and 16B are example diagrams depicting continuation of the action on any of the devices 204 that are present in any of the positions in the network environment, according to example embodiments.

In an example smart home network scenario, as depicted in FIG. 16A, the user is watching a movie on a television present in a living room. After a time period, the user starts moving towards a kitchen. In such a scenario, the user device 206 that is being using by the user (for example, a mobile phone or a wearable device like a watch) may capture a change in movement of the user (i.e., movement of the user towards the kitchen from the living room, where the user was watching the movie). The user device 206 may capture the change in movement of the user using the sensor 306. The user device 206 identifies the device(s) 204 that is present in the kitchen that may play the movie and the enable the identified device 204 to continue playing the movie that was playing on the television in the living room.

For identifying the devices 204 present in the kitchen, the user device 206 determines that the audio capability and the video capability are the functional capabilities to be used for playing the movie. The user device 206 determines the devices 204 from the plurality of devices 204 present in the smart home network k, that may include the audio capability and video capability. In an example, the devices 204 such as, a television present in a living room, a television present in a bedroom, and a family hub present in a kitchen may include the audio capability and the video capability. The user device 206 generates the audio watermarks for the television present in the living room, the television present in the bedroom, and the family hub present in the kitchen. The user device 206 stores the mapping of the devices 204 (the television present in the living room, the television present in the bedroom, and the family hub present in the kitchen) with the associated device IDs and the audio watermarks in the device type watermark creator database 318. The user device 206 generates the time slots for the audio watermarks generated for the television present in the living room, the television present in the bedroom, and the family hub present in the kitchen. The user device 206 requests the IoT cloud server 202 to send the respective audio watermarks and the associated time slots to the television in the living room, the television in the bedroom, and the family hub in the kitchen.

As depicted in FIG. 16B, the television present in the living room, the television present in the bedroom, and the family hub present in the kitchen indicate the received respective audio watermarks in the respective time slots. In this example scenario, the user device 206 may receive the audio watermark only from the family hub present in the kitchen, as the user device 206 is in the kitchen. The user device 206 analyzes the received audio watermark and converts/decodes the received audio watermark into the device ID. The user device 206 accesses the mapping of the devices 204 with the associated device IDs and the audio watermarks in the device type watermark creator database 318 and determines the device associated with the decoded device ID. The determined device associated with the decoded device ID may be the family hub present in the kitchen. The user device 206 enables (or controls) the family hub to continue playing the movie that is being played on the television present in the living room. Thus, the user experience may be enhanced by continuing the action on the device 204 that is present in a room to which the user has moved.

The example embodiments may be implemented through at least one software program running on at least one hardware device and performing network management functions to control the elements. The elements shown in FIGS. 2, 3, 4, and 5, may be at least one of a hardware device, or a combination of hardware device and software module.

The example embodiments describe methods and systems for identifying devices in an Internet of Things (IoT) environment. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in a preferred embodiment through or together with a software program written in e.g. Very high speed integrated circuit Hardware Description Language (VHDL) another programming language or implemented by one or more VHDL or several software modules being executed on at least one hardware device. The hardware device may be any kind of portable device that may be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the embodiments of the disclosure may be implemented on different hardware devices, e.g. using a plurality of CPUs.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing description of the example embodiments will fully reveal the general nature of the embodiments herein that a person of ordinary skill may readily modify and/or adapt the example embodiments for various applications without departing from the spirit of the disclosure. Therefore, such adaptations and modifications are intended to be comprehended within the meaning and range of equivalents of the example embodiments. It is to be understood that the phraseology or terminology employed herein is for the purpose of description only and not of limitation. Therefore, while the disclosure has been described with reference to example embodiments, those skilled in the art will recognize that the embodiments herein may be practiced with modification within the spirit and scope of the embodiments as described herein.

What is claimed is:

1. A method for identifying at least one device in an Internet of Things (IoT) environment, the method comprising:
   receiving, by a first device included in the IoT environment, an input to initiate at least one action;
   determining, by the first device, one or more second devices from a plurality of second devices in the IoT environment, the one or more second devices being capable of performing the at least one action;
   generating, by the first device, at least one device type watermark for each of the one or more second devices;
   transmitting, to an IoT cloud server by the first device, a request including at least one time slot for each of the one or more second devices, the request requesting each of the one or more second devices to indicate the at least one device type watermark in the at least one time slot; and
   identifying, by the first device, at least one second device to perform the at least one action, among the one or more second devices, based on detecting the at least one device type watermark indicated by the at least one second device.

2. The method of claim 1, wherein the at least one action includes at least one of:

an action associated with at least one application executable on at least one of the first device and the plurality of second devices;
continuing an action previously performed on one of the plurality of second devices on another one of the plurality of second devices based on a movement of a user in the IoT environment; and
registering, with the IoT cloud server, a second device of the plurality of second devices by using the first device.

3. The method of claim 1, wherein the determining includes:
obtaining, from at least one of the IoT cloud server and a first database, information about a functional capability of each of the plurality of second devices; and
determining the one or more second devices from the plurality of second devices, the one or more second devices including at least one functional capability to perform the at least one action.

4. The method of claim 1, wherein the generating includes:
generating the at least one device type watermark for each of the one or more second devices determined to have at least one functional capability to perform the at least one action.

5. The method of claim 4, further comprising:
accessing, by the first device, information about a device identifier (ID) of each of the one or more second devices from the IoT cloud server, based on generating the at least one device type watermark for each of the one or more second devices; and
updating, by the first device, information of device type watermarks stored in a second database by using the generated at least one device type watermark with an associated device ID of each of the one or more second devices.

6. The method of claim 4, wherein the at least one device type watermark includes at least one of an audio watermark and a light watermark,
the audio watermark being a pattern array including sound waves, wherein the sound waves have frequencies higher than an upper audible limit of human hearing; and
the light watermark being a pattern array including properties of light, wherein the light watermark includes at least one of a brightness watermark, a color watermark, and an ON-OFF watermark.

7. The method of claim 1, wherein the identifying the at least one second device includes:
detecting the at least one device type watermark indicated by the at least one second device in the at least one time slot;
decoding the detected at least one device type watermark into at least one device identifier (ID); and
identifying the at least one second device associated with the decoded at least one device ID.

8. The method of claim 7, wherein the identifying the at least one second device associated with the decoded at least one device ID includes:
identifying the at least one second device associated with the decoded at least one device ID by accessing a second database configured to store information of device type watermarks in association with device IDs.

9. The method of claim 1, further comprising:
controlling, by the first device, the identified at least one second device to continue the at least one action, which was previously performed on another one of the plurality of second devices.

10. The method of claim 1, further comprising:
determining, by the first device, position information associated with the identified at least one second device; and
transmitting device information and the determined position information of the at least one second device to the IoT cloud server, to register the identified at least one second device with the IoT cloud server.

11. A first device in an Internet of Things (IoT) environment, the IoT environment comprising a plurality of second devices and an IoT cloud server, the first device comprising:
a memory configured to store program code; and
a processor configured to read the program code and operate as instructed by the program code to:
receive an input to initiate at least one action;
determine one or more second devices from the plurality of second devices in the IoT environment, the one or more second devices being capable of performing the at least one action;
generate at least one device type watermark for each of the one or more second devices;
transmit, to the IoT cloud server, a request including at least one time slot for each of the one or more second devices, the request requesting each of the one or more second devices to indicate the at least one device type watermark in the at least one time slot; and
identify at least one second device to perform the at least one action, among the one or more second devices, based on detecting the at least one device type watermark indicated by the at least one second device.

12. The first device of claim 11, wherein the at least one action includes at least one of:
an action associated with at least one application executable on at least one of the first device and the plurality of second devices;
continuing an action previously performed on one of the plurality of second devices on another one of the plurality of second devices based on a movement of a user in the IoT environment; and
registering, with the IoT cloud server, a second device of the plurality of second devices by using the first device.

13. The first device of claim 11, wherein the processor is further configured to:
obtain, from at least one of the IoT cloud server and a first database, information about a functional capability of each of the plurality of second devices; and
determine the one or more second devices from the plurality of second devices, the one or more second devices including at least one functional capability to perform the at least one action.

14. The first device of claim 11, wherein the processor is further configured to:
generate the at least one device type watermark for each of the one or more second devices determined to have at least one functional capability to perform the at least one action.

15. The first device of claim 14, wherein the processor is further configured to:
access information about a device identifier (ID) of each of the one or more second devices from the IoT cloud server, based on generating the at least one device type watermark for each of the one or more second devices; and
update information of a device type watermark stored in a second database by using the generated at least one device type watermark with an associated device ID of each of the one or more second devices.

16. The first device of claim 14, wherein the at least one device type watermark includes one of an audio watermark and a light watermark,
the audio watermark being a pattern array including sound waves, wherein the sound waves have frequencies higher than an upper audible limit of human hearing; and
the light watermark being a pattern array including properties of light, wherein the light watermark includes at least one of a brightness watermark, a color watermark, and an ON-OFF watermark.

17. The first device of claim 11, wherein the processor is further configured to:
detect the at least one device type watermark indicated by the at least one second device in the at least one time slot;
decode the detected at least one device type watermark into at least one device identifier (ID); and
identify the at least one second device associated with the decoded at least one device ID.

18. The first device of claim 17, wherein the processor is further configured to:
identify the at least one second device associated with the decoded at least one device ID by accessing a second database configured to store information of device type watermarks in association with device IDs.

19. The first device of claim 11, wherein the processor is further configured to control the identified at least one second device to continue the at least one action, which was previously performed on another one of the plurality of second devices.

20. The first device of claim 11, wherein the processor is further configured to:
determine position information associated with the identified at least one second device; and
transmitting device information and the determined position information of the at least one second device to the IoT cloud server, to register the identified at least one second device with the IoT cloud server.

* * * * *